United States Patent
Kim et al.

(10) Patent No.: US 12,079,591 B2
(45) Date of Patent: Sep. 3, 2024

(54) NEURAL NETWORK DEVICE, METHOD OF OPERATING THE NEURAL NETWORK DEVICE, AND APPLICATION PROCESSOR INCLUDING THE NEURAL NETWORK DEVICE

(71) Applicant: SAMSUNG ELECTRONICS CO., LTD., Suwon-si (KR)

(72) Inventors: Hyunpil Kim, Seoul (KR); Hyunwoo Sim, Seoul (KR); Seongwoo Ahn, Yongin-si (KR); Hasong Kim, Hwaseong-si (KR); Doyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 692 days.

(21) Appl. No.: 17/217,398

(22) Filed: Mar. 30, 2021

(65) Prior Publication Data
US 2021/0312012 A1   Oct. 7, 2021

(30) Foreign Application Priority Data

Apr. 7, 2020   (KR) .................. 10-2020-0042408
Jan. 5, 2021   (KR) .................. 10-2021-0001056

(51) Int. Cl.
*G06F 17/16*   (2006.01)
*G06F 5/01*    (2006.01)
(Continued)

(52) U.S. Cl.
CPC .............. *G06F 7/4876* (2013.01); *G06F 5/01* (2013.01); *G06F 7/22* (2013.01); *G06F 7/49921* (2013.01);
(Continued)

(58) Field of Classification Search
CPC ...... G06F 17/16; G06F 7/4876; G06F 7/5443; G06F 5/01; G06F 7/49921
See application file for complete search history.

(56) References Cited

U.S. PATENT DOCUMENTS 5,412,587 A * 5/1995 Holt .......................... G06F 7/70
                                                           708/250
10,380,481 B2  8/2019 Henry et al.
(Continued)

FOREIGN PATENT DOCUMENTS

KR    10-2009-0071823 A    7/2009
KR    10-2019-0098107 A    8/2019

OTHER PUBLICATIONS

Manish Kumar Jaiswal, Ray C. C. Cheung, M. Balakrishnan, and Kolin Paul, Unified Architecture for Double/Two-Parallel Single Precision Floating Point Adder, May 29, 2014, IEEE, p. 521-525 (Year: 2014).*

*Primary Examiner* — Andrew Caldwell
*Assistant Examiner* — Carlo Waje
(74) *Attorney, Agent, or Firm* — Sughrue Mion, PLLC

(57) ABSTRACT

A neural network device includes a floating-point arithmetic circuit configured to perform a dot product operation and an accumulation operation; and a buffer configured to store first cumulative data generated by the floating-point arithmetic circuit, wherein the floating-point arithmetic circuit is further configured to perform the dot product operation and the accumulation operation by: identifying a maximum value from a plurality of exponent addition results, obtained by respectively adding exponents of a plurality of floating-point data pairs, and an exponent value of the first cumulative data; performing, based on the maximum value, an align shift of a plurality of fraction multiplication results, obtained by respectively multiplying fractions of the plurality of floating-point data pairs, and a fraction part of the first
(Continued)

cumulative data; and performing a summation of the plurality of aligned fraction multiplication results and the aligned fraction part of the first cumulative data.

16 Claims, 15 Drawing Sheets

(51) Int. Cl.
- *G06F 7/22* (2006.01)
- *G06F 7/487* (2006.01)
- *G06F 7/499* (2006.01)
- *G06F 7/544* (2006.01)
- *G06N 3/02* (2006.01)

(52) U.S. Cl.
CPC ............ *G06F 7/5443* (2013.01); *G06F 17/16* (2013.01); *G06N 3/02* (2013.01)

(56) References Cited

U.S. PATENT DOCUMENTS

| | | |
|---|---|---|
| 2009/0172053 A1 | 7/2009 | Nam et al. |
| 2016/0041813 A1* | 2/2016 | Narayanamoorthy ........................ G06F 1/3243 708/190 |
| 2017/0102921 A1 | 4/2017 | Henry et al. |
| 2017/0103302 A1 | 4/2017 | Henry et al. |
| 2017/0323197 A1 | 11/2017 | Gibson et al. |
| 2018/0095728 A1* | 4/2018 | Hasenplaugh ........ G06F 1/3237 |
| 2019/0294415 A1* | 9/2019 | Kaul ..................... G06F 7/4876 |
| 2020/0050918 A1 | 2/2020 | Chen et al. |
| 2021/0034968 A1 | 2/2021 | Kim et al. |
| 2021/0157549 A1* | 5/2021 | Elmer .................... G06N 3/045 |
| 2021/0255830 A1* | 8/2021 | Ulrich .................. G06F 7/4876 |
| 2021/0263993 A1* | 8/2021 | Urbanski .............. G06F 7/5443 |

* cited by examiner

<FIRST TYPE FORMAT>

<SECOND TYPE FORMAT>

<THIRD TYPE FORMAT>

<INTEGER FORMAT>

FIG. 7B

Case1
- IN_A(FP) : | Sa | EXPONENT (Ea) | FRACTION (Fa) |
- IN_B(FP) : | Sb | EXPONENT (Eb) | FRACTION (Fb) |

Case2
- IN_A(FP) : | Sa | EXPONENT (Ea) | FRACTION (Fa) |
- IN_B(BF) : | Sb | EXPONENT (Eb) | FRACTION (Fb) |

Case3
- IN_A(BF) : | Sa | EXPONENT (Ea) | FRACTION (Fa) |
- IN_B(BF) : | Sb | EXPONENT (Eb) | FRACTION (Fb) |

NEURAL NETWORK DEVICE, METHOD OF OPERATING THE NEURAL NETWORK DEVICE, AND APPLICATION PROCESSOR INCLUDING THE NEURAL NETWORK DEVICE

CROSS-REFERENCE TO THE RELATED APPLICATIONS

This application is based on and claims priority under 35 U.S.C. § 119 to Korean Patent Application Nos. 10-2020-0042408, filed on Apr. 7, 2020, and 10-2021-0001056, filed on Jan. 5, 2021, in the Korean Intellectual Property Office, the disclosures of which are incorporated by reference herein in their entireties.

BACKGROUND

Example embodiments of the disclosure relate to a neural network, and more particularly, to a method and a device to perform floating-point calculation in a neural network device including a floating-point arithmetic circuit.

A neural network refers to a computational architecture that models a biological network of an animal brain. As neural network technology has recently been developed, there has been a lot of research into analyzing input data and extracting valid information using a neural network device, which operates based on a neural network, in various kinds of electronic systems.

A neural network device needs to perform a large amount of calculations with respect to complex input data. To enable a neural network device to analyze input data in real time and extract information, a technique for efficiently processing the operations of a neural network is required. In particular, a low-power high-performance system such as a smartphone has limited resources. Therefore, a technique for reducing the amount of calculations necessary to process complex input data and increasing the performance of an artificial neural network is desired.

SUMMARY

One or more example embodiments of the disclosure provide a method and a device to perform floating-point calculation in a neural network device including a floating-point arithmetic circuit.

According to an aspect of the disclosure, there is provided a neural network device for performing a neural network operation. The neural network device includes a floating-point arithmetic circuit configured to perform a dot product operation and an accumulation operation; and a buffer configured to store first cumulative data generated by the floating-point arithmetic circuit, wherein the floating-point arithmetic circuit is further configured to perform the dot product operation and the accumulation operation by: identifying a maximum value from a plurality of exponent addition results, obtained by respectively adding exponents of a plurality of floating-point data pairs, and an exponent value of the first cumulative data; performing, based on the maximum value, an align shift of a plurality of fraction multiplication results, obtained by respectively multiplying fractions of the plurality of floating-point data pairs, and a fraction part of the first cumulative data; and performing a summation of the plurality of aligned fraction multiplication results and the aligned fraction part of the first cumulative data.

According to another aspect of the disclosure, there is provided an operating method of a neural network device. The operating method includes receiving a plurality of floating-point data pairs and first cumulative data; identifying a maximum value from a plurality of exponent addition results, obtained by respectively adding exponents of the plurality of floating-point data pairs, and an exponent value of the first cumulative data; performing, based on the maximum value, an align shift of a plurality of fraction multiplication results, obtained by respectively multiplying fractions of the plurality of floating-point data pairs, and a fraction part of the first cumulative data; adding the plurality of aligned fraction multiplication results to the aligned fraction part of the first cumulative data; and generating second cumulative data based on a result of the adding.

According to a further aspect of the disclosure, there is provided an application processor including a neural network device, wherein the neural network device is configured to perform a dot product operation and an accumulation operation by: performing an align shift of a plurality of fraction multiplication results, obtained by respectively multiplying fractions of a plurality of floating-point data pairs, and a fraction part of first cumulative data, based on a plurality of exponent addition results, obtained by respectively adding exponents of the plurality of floating-point data pairs, and an exponent value of the first cumulative data; and performing a summation of the plurality of aligned fraction multiplication results and the aligned fraction part of the first cumulative data

BRIEF DESCRIPTION OF THE DRAWINGS

The above and/or other aspects will be more apparent by describing certain example embodiments with reference to the accompanying drawings, in which:

FIG. 7B is a diagram of format types of floating-point data pairs input to the floating-point arithmetic circuit;

DETAILED DESCRIPTION

Hereinafter, example embodiments will be described in detail with reference to the accompanying drawings.

Figure 1:
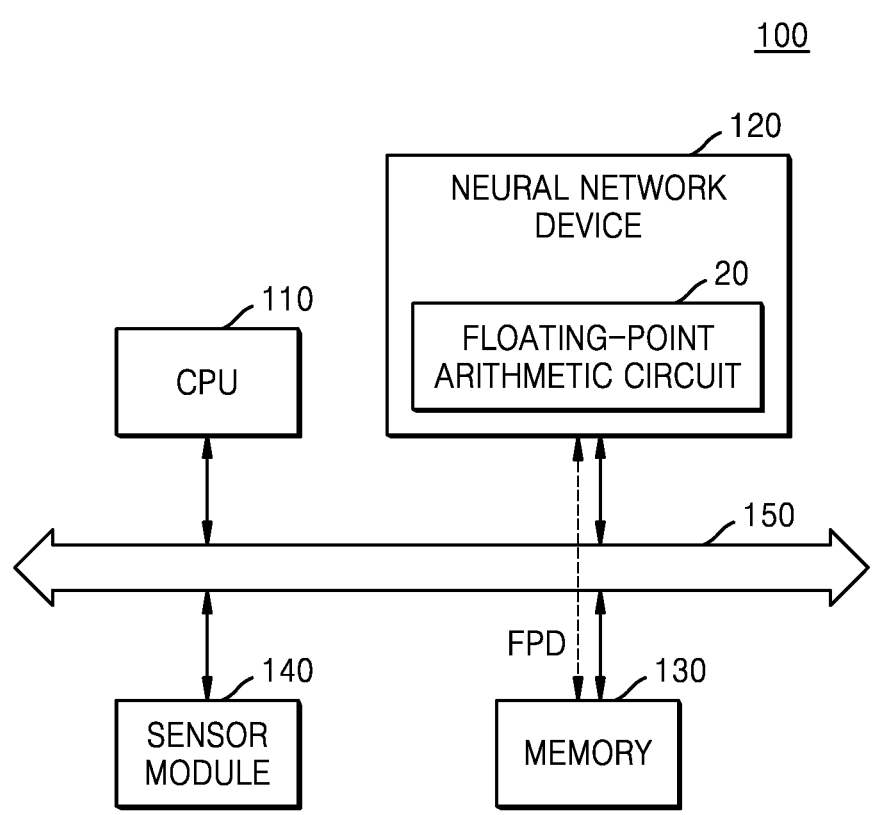
FIG. 1 is a schematic block diagram of a neural network system according to an example embodiment.

FIG. 1 is a schematic block diagram of a neural network system 100 according to an example embodiment.

The neural network system 100 may train a neural network or infer information from input data by analyzing the input data using the neural network. The neural network system 100 may determine a situation based on the inferred information or control the elements of an electronic device having the neural network system 100 mounted thereon. For example, the neural network system 100 may be applied to a smartphone, a tablet device, a smart television (TV), an augmented reality (AR) device, an Internet of things (IOT) device, an autonomous vehicle, a robot, a medical device, a drone, an advanced drivers assistance system (ADAS), an image display device, measuring equipment, and the like, which perform voice recognition, image recognition, image classification, and the like using a neural network. The neural network system 100 may be mounted on any other various kinds of electronic devices. In an embodiment, the neural network system 100 of FIG. 1 may correspond to an application processor.

Referring to FIG. 1, the neural network system 100 may include a central processing unit (CPU) 110, a neural network device 120, a memory 130, and a sensor module 140. The neural network system 100 may further include an input/output module, a security module, a power controller, or the like and may further include various kinds of processors. In some embodiments, some or all elements (e.g., the CPU 110, the neural network device 120, the memory 130, and the sensor module 140) of the neural network system 100 may be formed in a single semiconductor chip. For example, the neural network system 100 may be implemented as a system-on-chip (SoC). The elements of the neural network system 100 may communicate with each other through a bus 150. Although not shown in FIG. 1, the neural network system 100 may further include interfaces (not shown) for communication with other intellectual property (IP) blocks.

The CPU 110 generally controls the operations of the neural network system 100. The CPU 110 may include a single core or multiple cores. The CPU 110 may process or execute programs and/or data, which are stored in a storage area such as the memory 130.

For example, the CPU 110 may execute an application and control the neural network device 120 to perform neural network-based tasks involved in the execution of the application. A neural network may include at least one of various kinds of neural network models such as a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network.

The neural network device 120 may perform a neural network operation based on input data. The neural network device 120 may generate an information signal based on a result of performing a neural network operation. The neural network device 120 may include a neural network operation accelerator, a coprocessor, a digital signal processor (DSP), an application specific integrated circuit (ASIC), or the like. In some embodiments, the neural network device 120 may include at least one cluster of neural processing circuits.

According to an example embodiment, the neural network device 120 may include a floating-point arithmetic circuit 20 and perform a neural network operation based on a floating-point calculation. The floating-point arithmetic circuit 20 may perform a dot product operation on a plurality of pieces of floating-point data and accumulate dot product results. A plurality of pieces of floating-point data may be divided into a plurality of floating-point data pairs for a dot product operation and input to the floating-point arithmetic circuit 20.

A neural network may include a real number, e.g., floating-point data expressed as a floating-point number. For example, floating-point data may include a feature map, a kernel (or a weight map), a bias, or the like. When data is expressed using a floating point, the data may be expressed to have a broad range of values, and an approximation of a real number may be appropriately expressed.

In an example embodiment, the floating-point arithmetic circuit 20 may support a dot product operation on floating-point data having various types of formats. The floating-point arithmetic circuit 20 may extend at least one of an exponent bit field and a fraction bit field of floating-point data to be suitable for an agreed bit width so that a dot product operation is performed on a plurality of pieces of floating-point data having different types of formats all together.

In an example embodiment, the floating-point arithmetic circuit 20 may perform an exponent addition operation on floating-point data pairs (e.g., respectively adding exponents of the floating-point data pairs) and a fraction multiplication operation on the floating-point data pairs (e.g., respectively multiplying fractions of the floating-point data pairs) in a dot product operation, thereby generating an exponent addition result and a fraction multiplication result, which correspond to each of the floating-point data pairs.

In an example embodiment, the floating-point arithmetic circuit 20 may perform an accumulation operation by adding cumulative data to fraction multiplication results in a dot product operation. The cumulative data may be generated by accumulating dot product results of the neural network device 120 and stored in a buffer (not shown) of the neural network device 120.

In an example embodiment, before adding the cumulative data to the fraction multiplication results, the floating-point arithmetic circuit 20 may perform an align shift to align floating points of the fraction multiplication results and the cumulative data with one another. The floating-point arithmetic circuit 20 may perform an align shift of a fraction part of the cumulative data and the fraction multiplication results based on the maximum value identified from an exponent value of the cumulative data and exponent addition results.

A shiftable bit width of an align shifter, which is included in the floating-point arithmetic circuit 20 for a dot product operation, may be decreased to an extent that an operation accuracy required by the neural network system 100 is not affected. Accordingly, the size of the align shifter and power consumption of the neural network device 120 may be reduced, and a dot product operation speed may be increased. When the neural network system 100 requires a relatively high calculation accuracy, the align shifter of the floating-point arithmetic circuit 20 may be designed to align data in a relatively long bit width. When the calculation accuracy required by the neural network system 100 is relatively low, the align shifter of the floating-point arithmetic circuit 20 may be designed to align data in a relatively short bit width.

In an example embodiment, the floating-point arithmetic circuit 20 may simultaneously perform a dot product operation and an accumulation operation by adding the aligned fraction multiplication results to the aligned fraction part of the cumulative data all together. For this operation, the floating-point arithmetic circuit 20 may include an adder (not shown), which simultaneously receives the aligned fraction multiplication results and the aligned fraction part of the cumulative data.

In an example embodiment, the adder of the floating-point arithmetic circuit 20 may include a first adder circuit and a second adder circuit separate from each other. For example, the first adder circuit may add upper bits of the aligned fraction multiplication results to upper bits of the aligned fraction part of the cumulative data, and the second adder circuit may add low-order bits of the aligned fraction multiplication results to lower bits of the aligned fraction part of the cumulative data. The configuration in which the first and second adder circuits are separate from each other may be suitable for leading one detection with respect to addition result data output from the adder and may optimize a logic (e.g., a post-adder) after the adder. An example embodiment of the leading one detection will be described below.

The neural network device 120 may further include an integer multiplier (not shown), which performs an integer multiplication operation, and one of the first and second adder circuits may be shared with the integer multiplier. Accordingly, another adder is unnecessary for an integer multiplication operation, and therefore, the size and power consumption of the neural network device 120 may be reduced. An example embodiment related to an operation of the floating-point arithmetic circuit 20 in an integer calculation mode will be described below.

In an example embodiment, the floating-point arithmetic circuit 20 may generate new cumulative data by performing operations such as normalization and rounding on the addition result data output from the adder. The new cumulative data may be stored in a buffer (not shown) of the floating-point arithmetic circuit 20.

In an example embodiment, an align shifter (not shown), an adder (not shown), and the like, which are included in the floating-point arithmetic circuit 20, may be relatively small in size. Therefore, the floating-point arithmetic circuit 20 may operate relatively fast, have low power consumption, and reduce the amount of resources used when performing a dot product operation.

The neural network device 120 may receive a plurality of floating-point data pieces FPD from the memory 130 as input data pieces and may perform a dot product operation on the floating-point data pieces FPD using the floating-point arithmetic circuit 20. The neural network device 120 may accumulate a plurality of dot product results using the floating-point arithmetic circuit 20. Cumulative data may be stored in a buffer (not shown) of the neural network device 120.

The neural network device 120 may perform a neural network operation using the floating-point data pieces FPD and store an operation result in the memory 130. The neural network device 120 may output the floating-point data pieces FPD generated as an operation result. In an example embodiment, the format type of input data input to the floating-point arithmetic circuit 20 may be different from the format type of output data output from the floating-point arithmetic circuit 20. For example, the input data may have a floating-point 16 (FP16)-type format or a brain float 16 (BF16)-type format, and the output data may have a floating-point 32 (FP32)-type format. In other words, 16-bit data may be input to the floating-point arithmetic circuit 20, and 32-bit data may be output as a result of a dot product operation and an accumulation operation. However, this is merely an example embodiment, and embodiments of the disclosure are not limited thereto. The floating-point arithmetic circuit 20 may receive data having a first type format and output data having a second type format after performing a dot product operation and an accumulation operation according to a standard applied to the neural network system 100.

The neural network device 120 may perform a dot product operation and an accumulation operation on the floating-point data pieces FPD, which are received from the memory 130, using the floating-point arithmetic circuit 20 and store floating-point data pieces FPD corresponding to an operation result in the memory 130. In some embodiments, the neural network device 120 may exchange the floating-point data pieces FPD with the memory 130 through the bus 150 without intervention by the CPU 110. In other words, the neural network device 120 may directly exchange the floating-point data pieces FPD with the memory 130.

The memory 130 may store programs and/or data, which are used in the neural network system 100. The memory 130 may also store operational parameters (e.g., weights, biases, etc.) for a neural network, parameters (e.g., a scale factor, biases, etc.) for quantization of a neural network, input data (e.g., an input feature map), and output data (e.g., an output feature map). The operational parameters, the quantization parameters, the input data, and the output data may be included in the floating-point data pieces FPD.

The memory 130 may include dynamic random access memory (DRAM) but is not limited thereto. The memory 130 may include at least one of a volatile memory and a non-volatile memory. The non-volatile memory may include a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM). The volatile memory may include a DRAM, a static RAM (SRAM), and a synchronous DRAM (SDRAM). In an embodiment, the memory 130 may include at least one of a hard disk drive (HDD), a solid state drive (SSD), a compact flash (CF) card, a secure digital (SD) card, a micro-SD card, a mini-SD card, an extreme digital (xD) card, and a memory stick.

The sensor module 140 may collect information about the surroundings of an electronic device, on which the neural network system 100 is mounted. The sensor module 140 may sense or receive signals (e.g., an image signal, a voice signal, a magnetic signal, a bio signal, and a touch signal) from the outside of the electronic device and convert sensed or received signals into sensed data. For this operation, the sensor module 140 may include at least one of various kinds of sensing devices, such as a microphone, an imaging device, an image sensor, a light detection and ranging (LIDAR) sensor, an ultrasonic sensor, an infrared sensor, a bio sensor, a touch sensor, and the like.

The sensed data may be provided to the neural network device 120 as input data or stored in the memory 130. The sensed data stored in the memory 130 may be provided to the neural network device 120. In an embodiment, the neural network system 100 may further include a graphics processing unit (GPU), which processes image data, and the sensed data may be processed by the GPU and then provided to the memory 130 or the neural network device 120.

For example, the sensor module 140 may include an image sensor and may photograph an external environment of an electronic device and generate image data. Image data output from the sensor module 140 or image data processed by the GPU may include floating-point data and may be directly provided to the floating-point arithmetic circuit 20 or stored in the memory 130 before being provided to the floating-point arithmetic circuit 20. In some embodiments, the neural network system 100 may further include a pre-processor, which processes data to be input to the neural network device 120, or a post-processor, which processes data output from the neural network device 120.

In some embodiments, the neural network system 100 of FIG. 1 may not include the sensor module 140 and may receive input data from a sensor module (not shown) or the like, which is separately provided, through an interface.

Figure 2:
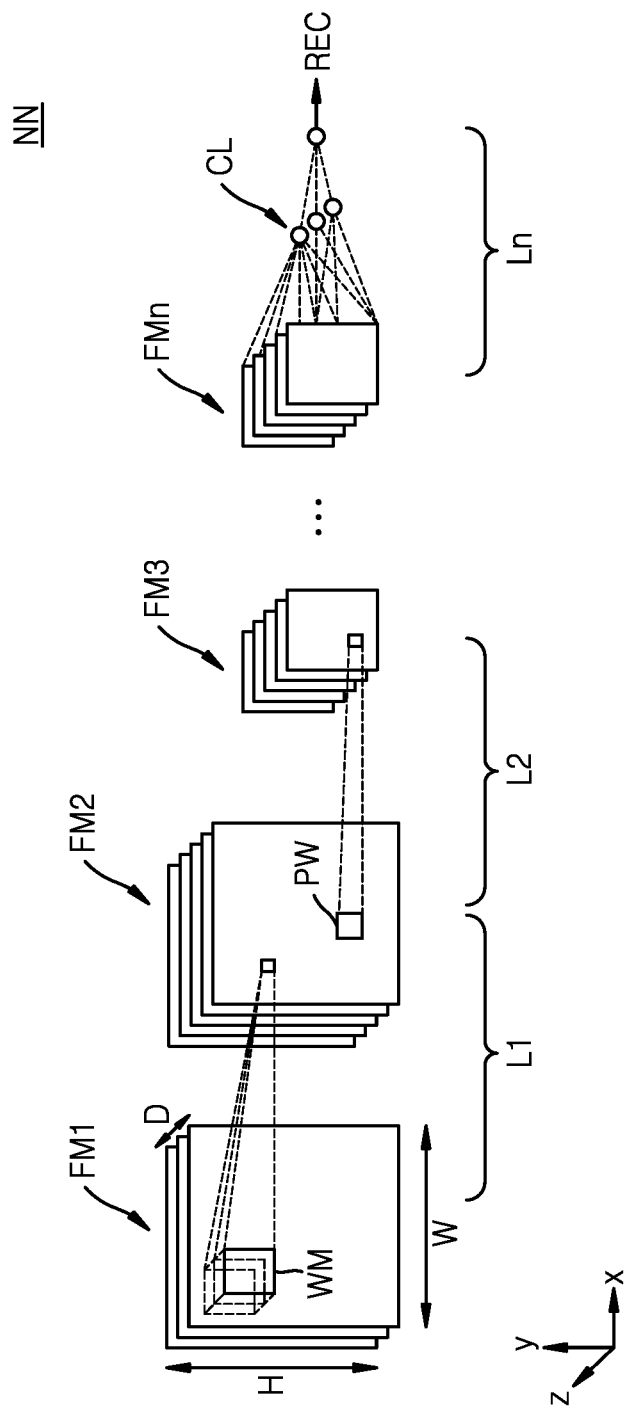
FIG. 2 illustrates an example of a neural network architecture.

FIG. 2 illustrates an example of a neural network architecture. Referring to FIG. 2, a neural network NN may include a plurality of layers, for example, first through n-th layers L1, L2, . . . Ln. The neural network NN with such multilayer architecture may be referred to as a deep neural network (DNN) or a deep learning architecture. Each of the first through n-th layers L1 through Ln may include a linear layer or non-linear layer. In an embodiment, at least one linear layer may be combined with at least one non-linear layer, thereby forming a single layer. For example, linear layers may include a convolution layer and a fully-connected layer, and non-linear layers may include a pooling layer and an activation layer.

For example, the first layer L1 may correspond to a convolution layer, the second layer L2 may correspond to a pooling layer, and the n-th layer Ln may correspond to a fully-connected layer as an output layer. The neural network NN may further include an activation layer and may further include other layers performing other kinds of operations.

Each of the first through n-th layers L1 through Ln may receive, as an input feature map, an image frame or a feature map generated in a previous layer and may generate an output feature map or a recognition signal REC by performing an operation on the input feature map. At this time, the feature map refers to data which represents various features of input data. For example, first through n-th feature maps FM1, FM2, FM3, and FMn may have a two-dimensional matrix or a three-dimensional matrix (or a tensor) form, which includes a plurality of feature values. The first through n-th feature maps FM1 through FMn may have a width W (or a column), a height H (or a row), and a depth D, which may respectively correspond to the x-axis, the y-axis, and the z-axis in a coordinate system. At this time, the depth D may be referred to as the number of channels.

The first layer L1 may generate the second feature map FM2 by performing a convolution on the first feature map FM1 and a weight map WM. The weight map WM may have a two-dimensional or three-dimensional matrix form including a plurality of weights. The weight map WM may be referred to as a kernel. The weight map WM may filter the first feature map FM1 and may be referred to as a filter or a kernel. The depth, i.e., the number of channels, of the weight map WM may be same as the depth, i.e., the number of channels, of the first feature map FM1. A convolution may be performed on the same channels in both the weight map WM and the first feature map FM1. The weight map WM may be shifted on the first feature map FM1 by traversing the first feature map FM1 using a sliding window. During a shift, each weight included in the weight map WM may be multiplied by and added to all feature values in an area where the weight map WM overlaps the first feature map FM1. One channel of the second feature map FM2 may be generated by performing a convolution on the first feature map FM1 and the weight map WM. Although only one weight map WM is shown in FIG. 2, a plurality of weight maps WM may be convolved with the first feature map FM1 so that a plurality of channels of the second feature map FM2 may be generated. In other words, the number of channels of the second feature map FM2 may correspond to the number of weight maps.

The second layer L2 may generate the third feature map FM3 by changing a spatial size of the second feature map FM2 through pooling. The pooling may be referred to as sampling or downsampling. A two-dimensional pooling window PW may be shifted on the second feature map FM2 by a unit of the size of the pooling window PW, and a maximum value among feature values (or an average of the feature values) in an area, in which the pooling window PW overlaps the second feature map FM2, may be selected. As such, the third feature map FM3 may be generated by changing the spatial size of the second feature map FM2. The number of channels of the third feature map FM3 may be the same as the number of channels of the second feature map FM2.

The n-th layer Ln may combine features of the n-th feature map FMn and categorize a class CL of the input data. The n-th layer Ln may also generate the recognition signal REC corresponding to the class CL. For example, when the input data corresponds to image data and the neural network NN performs image recognition, the n-th layer Ln may extract a class corresponding to an object of an image represented by the image data based on the n-th feature map FMn provided from a previous layer, recognize the object, and generate the recognition signal REC corresponding to the object.

As described above with reference to FIG. 2, the neural network NN may have a complex architecture, and a neural network device, which performs a neural network operation, performs a huge number of operations counting from several hundreds of millions up to several tens of billions. According to an example embodiment, the neural network device 120 of FIG. 1 simplifies the configurations of an align shifter, an adder, and the like to an extent that the accuracy of a neural network operation is not affected and performs an efficient network operation using the simplified configurations, thereby reducing the power consumption and the design area thereof and increasing an operation speed thereof.

Figure 3A:
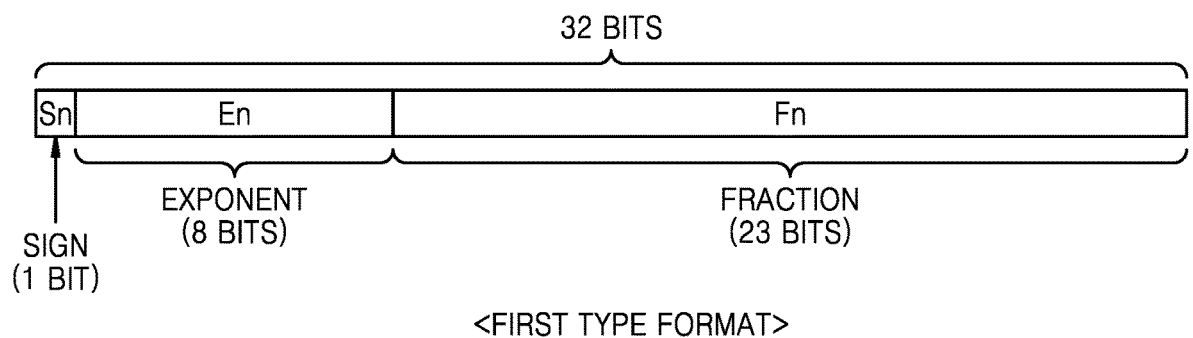
FIGS. 3A through 3C are diagrams of examples of types of floating-point data formats.
Figure 3B:
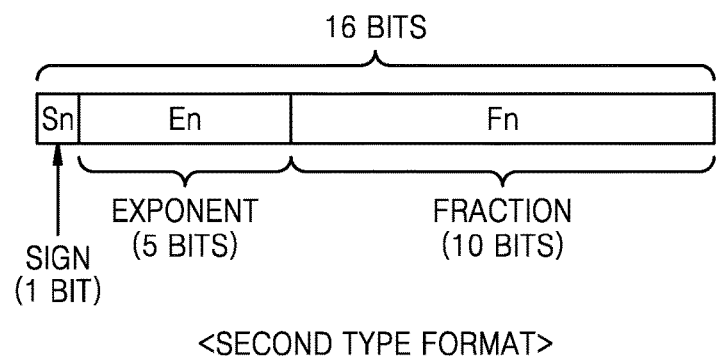
Figure 3C:
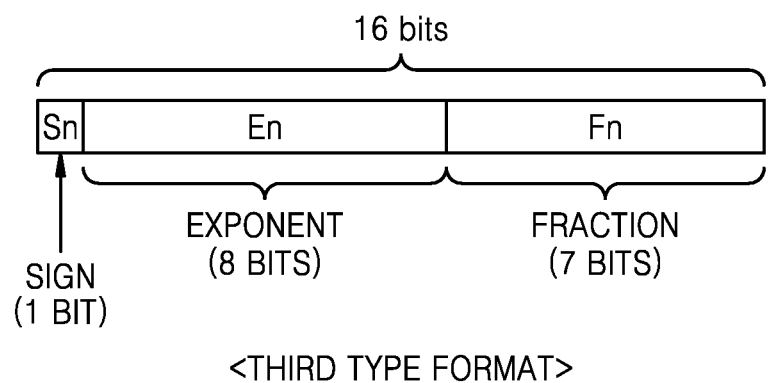
Figure 3D:
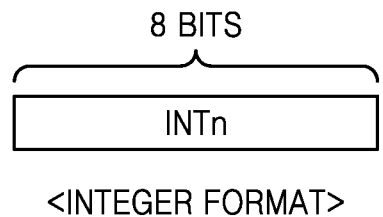
FIG. 3D is a diagram of an example of integer data.

FIGS. 3A through 3C are diagrams of examples of types of floating-point data formats, and FIG. 3D is a diagram of an example of integer data.

Referring to FIG. 3A, floating-point data may be represented with a sign and a form of $1 \cdot a \times 2^b$, where "b" is an exponent and "a" is a fraction. According to the Institute of Electrical and Electronics Engineers (IEEE) 754-2008, which is the standard for a floating-point arithmetic, in the case of a first type format, 32-bit floating-point data includes one bit representing a sign, 8 bits representing an exponent, and 23 bits representing a fraction. As shown in FIG. 3A, a most significant bit (MSB) may represent a sign Sn, 8 bits following the MSB may represent an exponent En, and the remaining 23 bits may represent a fraction Fn (or a significand). Hereinafter, floating-point data having the first type format may be referred to as floating-point 32 (FP32).

Referring to FIG. 3B, in the case of a second type format, 16-bit floating-point data includes one bit representing a sign Sn, 5 bits representing an exponent En, and 10 bits representing a fraction Fn, according to the IEEE 754-2008 standard. In other words, 5 bits following the MSB may represent an exponent, and the remaining 10 bits may represent a fraction (or a significand). Hereinafter, floating-point data having the second type format may be referred to as floating-point 16 (FP16).

Referring to FIG. 3C, in the case of a third type format, 16-bit floating-point data includes one bit representing a sign Sn, 8 bits representing an exponent En, and 7 bits representing a fraction Fn. In other words, 8 bits following the MSB may represent an exponent, and the remaining 7 bits may represent a fraction (or a significand). Hereinafter, floating-point data having the third type format may be referred to as brain float 16 (BF16).

Referring to FIG. 3D, data in an integer format may be expressed in various types according to existence or non-existence of a sign and a data size (e.g., the number of bits). For example, an integer generally used for computing may be expressed as 8-bit data (e.g., 2's complement) including a sign, as shown in FIG. 3D. At this time, in the case of a signed number, the MSB represents a sign and the following 7 bits represent an integer INTn, and the signed number has a size of $$\sum_{0}^{6} \text{INT}n * 2^n - \text{INT}_7 * 2^7.$$

In the case of an unsigned number, the unsigned number is a positive number and has a size of $$\sum_{0}^{7} \text{INT}n * 2^n.$$

According to an example embodiment, a neural network device may receive floating-point data pieces corresponding to at least one of the first through third type formats and perform a dot product operation and an accumulation operation. For example, the neural network device may receive floating-point data pieces corresponding to at least one of an FP16-type format, a BF16-type format, and an FP32-type format and perform a dot product operation and an accumulation operation on the floating-point data pieces, thereby outputting cumulative data having the FP32-type format. However, this is merely an example embodiment, and embodiments are not limited thereto. The neural network device may receive floating-point data pieces having other various type formats and perform a dot product operation and an accumulation operation, thereby outputting cumulative data having an agreed format required by a neural network system.

Figure 4:
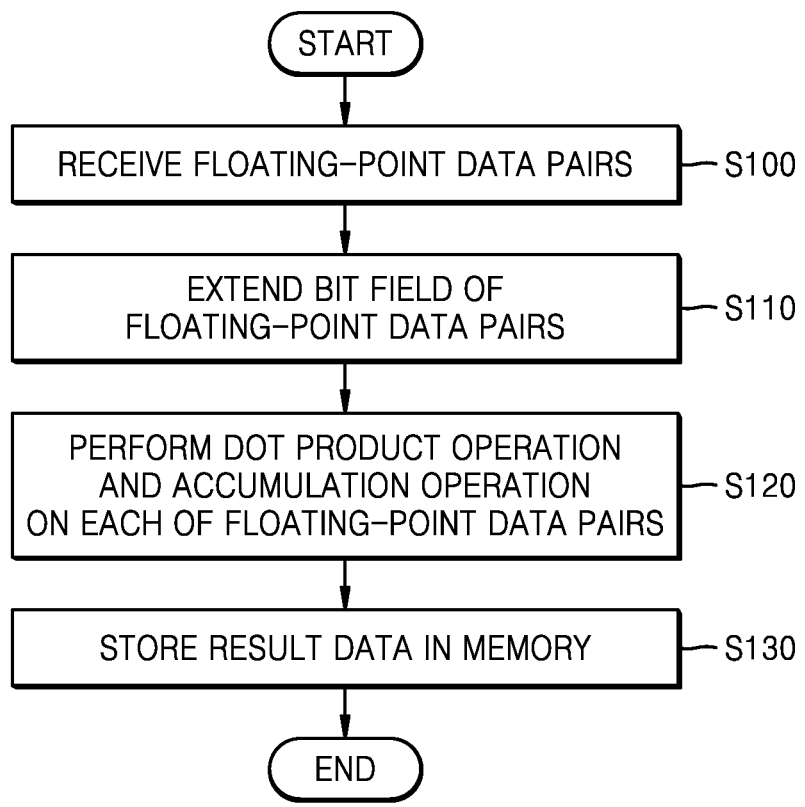
FIG. 4 is a flowchart of an operating method of a neural network device, according to an example embodiment.

FIG. 4 is a flowchart of an operating method of a neural network device, according to an example embodiment. The operating method of FIG. 4 may be performed by the neural network device 120 in FIG. 1 for a neural network operation. For the sake of understanding, FIG. 1 will also be referred to in the description.

Referring to FIG. 4, the neural network device 120 may receive a plurality of floating-point data pairs from the memory 130 in operation S100. The floating-point data pairs may include input feature values, weights, coefficients of a function, and the like, which are used in a neural network operation. When the neural network device 120 processes a quantized neural network, the floating-point data pairs may include quantization parameters. For example, the quantization parameters may include a scale factor (or an inverse scale factor), a bias, and the like.

The neural network device 120 may extend a bit field of the floating-point data pairs in operation S110. The neural network device 120 may extend one of an exponent bit field and a fraction bit field of data to be suitable to an agreed bit width to perform a dot product operation on the floating-point data pairs all together. This will be described in detail with reference to FIGS. 8A and 8B.

The neural network device 120 may perform a dot product operation and an accumulation operation on each of the floating-point data pairs in operation S120. The neural network device 120 may perform an exponent addition operation and a fraction multiplication operation on the floating-point data pairs. The neural network device 120 may identify the maximum value from exponent addition results respectively corresponding to the floating-point data pairs and an exponent value of cumulative data. The neural network device 120 may perform an align shift of a fraction part of the cumulative data and fraction multiplication results respectively corresponding to the floating-point data pairs based on the maximum value and add the aligned fraction multiplication results to the aligned fraction part of the cumulative data all together. The neural network device 120 may generate new cumulative data using addition result data. The neural network device 120 may further perform a neural network operation, which includes convolution, pooling, or the like, in addition to the dot product operation in operation S120.

The neural network device 120 may store final data, which is generated in operation S120, in the memory 130 in operation S130.

Figure 5:
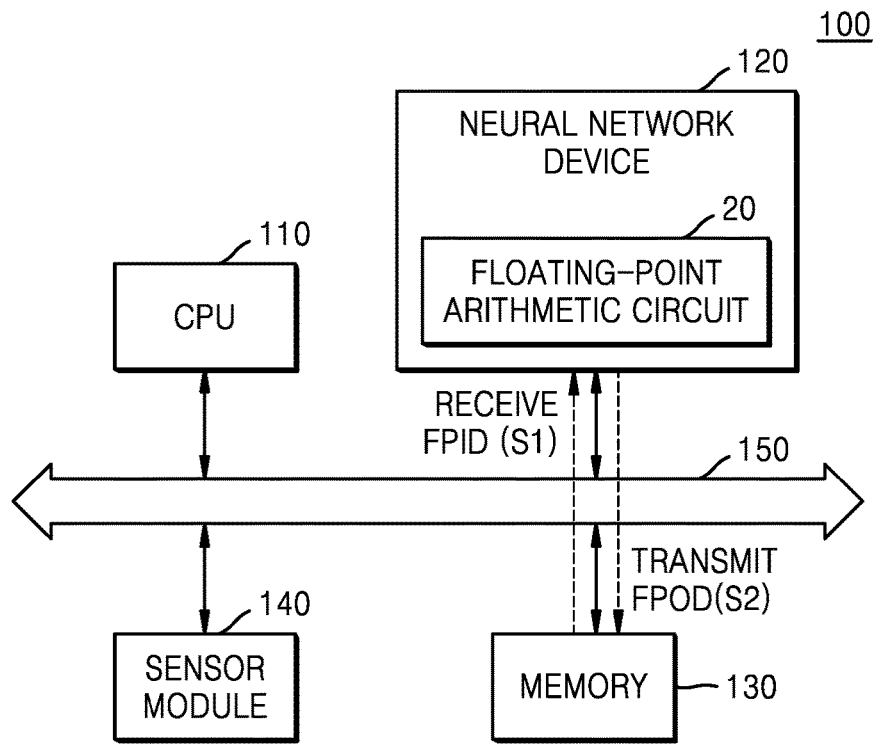
FIG. 5 is a diagram showing operations of a neural network system, according to an example embodiment.

FIG. 5 is a diagram showing the operations of the neural network system 100, according to an example embodiment.

Referring to FIG. 5, the neural network device 120 may receive floating-point input data pieces FPID from the memory 130 in operation S1. In some embodiments, the floating-point input data pieces FPID may be transmitted from the memory 130 to the neural network device 120 through the bus 150 without intervention by the CPU 110. For example, the neural network device 120 may include a direct memory access (DMA) controller, and the DMA controller may access the memory 130 and read the floating-point input data pieces FPID. The neural network device 120 may perform a neural network operation, which includes a dot product operation and an accumulation operation, on the floating-point input data pieces FPID using the floating-point arithmetic circuit 20. The neural network device 120 may generate floating-point output data FPOD as a result of the neural network operation and transmit the floating-point output data FPOD to the memory 130 in operation S2.

As described above, according to an example embodiment, the neural network device 120 may perform a dot product operation and an accumulation operation fast and efficiently with low power consumption.

Figure 6:
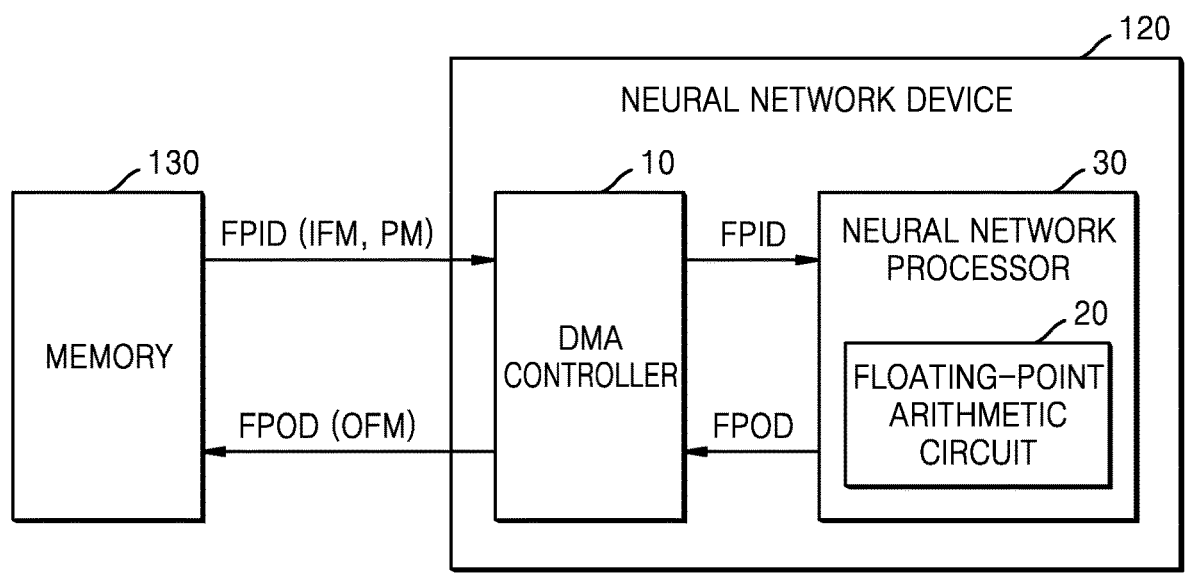
FIG. 6 is a diagram of a neural network device according to an example embodiment.

FIG. 6 is a diagram of the neural network device 120 according to an example embodiment. For convenience of description, the memory 130 is also illustrated.

Referring to FIG. 6, the neural network device 120 may include a DMA controller 10 and a neural network processor 30. In an example embodiment, the neural network processor 30 may include the floating-point arithmetic circuit 20, which may perform a dot product operation and an accumulation operation according to example embodiments.

The DMA controller 10 may directly communicate with the memory 130. The DMA controller 10 may receive input data (e.g., the floating-point input data pieces FPID) from the memory 130 and transmit output data (e.g., the floating-point output data FPOD), which is generated as a result of a neural network operation, to the memory 130, without intervention by other processors such as a CPU and a GPU.

For example, the floating-point input data pieces FPID may include an input feature map IFM, an operational parameter PM, or a weight map (or a kernel parameter). The floating-point input data pieces FPID may also include a quantization parameter.

The floating-point arithmetic circuit 20 may perform a dot product operation and an accumulation operation on the floating-point input data pieces FPID. The floating-point arithmetic circuit 20 may perform a dot product operation on each of floating-point data pairs, into which the floating-point input data pieces FPID are divided by a pair of data pieces undergoing a dot product operation. The floating-point arithmetic circuit 20 may perform a dot product operation, which includes an exponent addition operation and a fraction multiplication operation, on each of the floating-point data pairs.

In an example embodiment, in a dot product operation and an accumulation operation, the floating-point arithmetic circuit 20 may perform an align shift of a fraction part of cumulative data and fraction multiplication results respectively corresponding to the floating-point data pairs all together, based on an exponent value of the cumulative data and exponent addition results respectively corresponding to the floating-point data pairs, and then add the fraction multiplication results to the fraction part of the cumulative data. In an example embodiment, the floating-point arithmetic circuit 20 may identify the maximum value from the exponent addition results and the exponent value of the cumulative data; perform an align shift of each of the fraction multiplication results in a direction, which corresponds to a difference between each of the exponent addition results and the maximum value, by the number of bits, which corresponds to the difference between each of the exponent addition results and the maximum value; and perform an align shift of the fraction part of the cumulative data in a direction, which corresponds to a difference between the exponent value of the cumulative data and the maximum value, by the number of bits, which corresponds to the difference between the exponent value of the cumulative data and the maximum value. The floating-point arithmetic circuit 20 may simultaneously perform a dot product operation and an accumulation operation by adding aligned fraction multiplication results to aligned fraction part of the cumulative data, thereby generating new cumulative data.

Before or after the operation of the floating-point arithmetic circuit 20, the neural network processor 30 may perform a neural network operation, such as convolution or pooling, besides a floating-point calculation and generate the floating-point output data FPOD. For example, the floating-point output data FPOD may include an output feature map OFM.

The neural network processor 30 may include a processing element array including a plurality of processing elements. Although not shown, the neural network processor 30 may include a controller and a buffer storing neural network parameters such as biases, weights, input features, and output features. The processing elements may form the floating-point arithmetic circuit 20, and the neural network processor 30 may perform a neural network operation, which includes a floating-point based calculation according to example embodiments, using the floating-point arithmetic circuit 20.

Hereinafter, the configuration and operation of the floating-point arithmetic circuit 20 will be described.

Figure 7A:
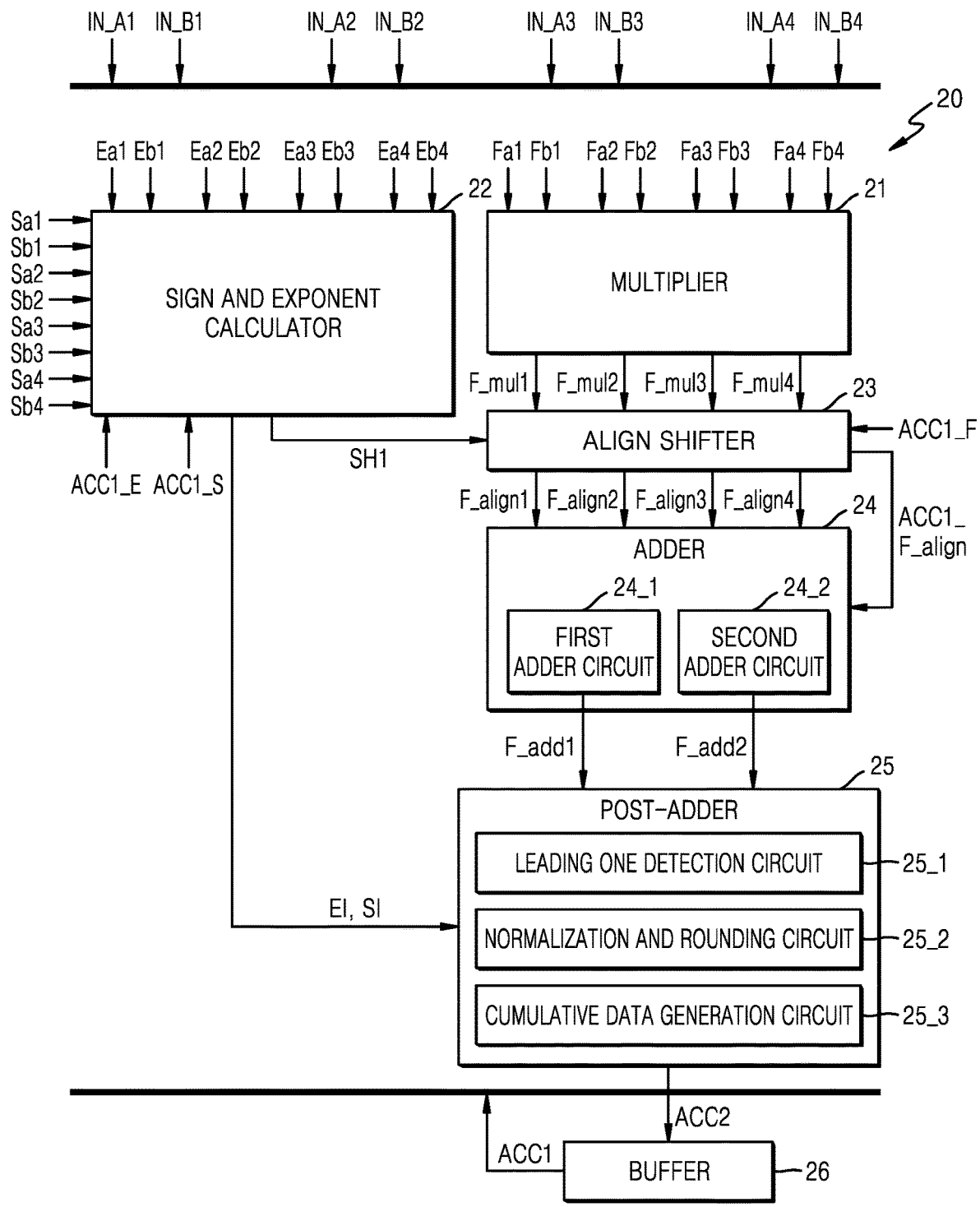
FIG. 7A is a diagram of a floating-point arithmetic circuit that performs a dot product operation, according to an example embodiment.

FIG. 7A is a diagram of the floating-point arithmetic circuit 20 that performs a dot product operation, according to an example embodiment, and FIG. 7B is a diagram of format types of floating-point data pairs P1, P2, and P3 input to the floating-point arithmetic circuit 20.

Referring to FIG. 7A, the floating-point arithmetic circuit 20 may include a multiplier 21 (or a floating-point multiplier), a sign and exponent calculator 22, an align shifter 23, an adder 24, a post-adder 25, and a buffer 26. Logics after the adder 24 are collectively named the post-adder 25. The post-adder 25 may include a leading one detection circuit 25_1, a normalization and rounding circuit 25_2, and a cumulative data generation circuit 25_3.

The floating-point arithmetic circuit 20 may receive first cumulative data ACC1 from the buffer 26. A sign ACC1_S and an exponent ACC1_E of the first cumulative data ACC1 may be input to the sign and exponent calculator 22, and a fraction ACC1_F of the first cumulative data ACC1 may be input to the align shifter 23.

The floating-point arithmetic circuit 20 may perform a dot product operation on first through fourth floating-point data pairs. The first floating-point data pair may include first and second floating-point data IN_A1 and IN_B1, the second floating-point data pair may include third and fourth floating-point data IN_A2 and IN_B2, the third floating-point data pair may include fifth and sixth floating-point data IN_A3 and IN_B3, and the fourth floating-point data pair may include seventh and eighth floating-point data IN_A4 and IN_B4. Respective signs Sa1, Sb1, Sa2, Sb2, Sa3, Sb3, Sa4, and Sb4 and respective exponents Ea1, Eb1, Ea2, Eb2, Ea3, Eb3, Ea4, and Eb4 of the first through eighth floating-point data IN_A1, IN_B1, IN_A2, IN_B2, IN_A3, IN_B3, IN_A4, and IN_B4 may be input to the sign and exponent calculator 22. Respective fractions Fa1, Fb1, Fa2, Fb2, Fa3, Fb3, Fa4, and Fb4 of the first through eighth floating-point data IN_A1, IN_B1, IN_A2, IN_B2, IN_A3, IN_B3, IN_A4, and IN_B4 may be input to the multiplier 21.

The multiplier 21 may generate first through fourth fraction multiplication results F_mul1, F_mul2, F_mul3, and F_mul4 by performing multiplication operations on the fractions Fa1, Fb1, Fa2, Fb2, Fa3, Fb3, Fa4, and Fb4 and provide the first through fourth fraction multiplication results F_mul1, F_mul2, F_mul3, and F_mul4 to the align shifter 23. In an example embodiment, the multiplier 21 may include an 11-bit multiplier or a 24-bit or 32-bit multiplier having an extended number of bits.

The sign and exponent calculator 22 may generate exponent information EI and sign information SI by determining a sign and performing exponent addition operations based on the signs Sa1, Sb1, Sa2, Sb2, Sa3, Sb3, Sa4, and Sb4 and the exponents Ea1, Eb1, Ea2, Eb2, Ea3, Eb3, Ea4, and Eb4.

In an example embodiment, the sign and exponent calculator 22 may identify the maximum value from exponent addition results and a value (or an exponent value) of the exponent ACC1_E of the first cumulative data ACC1 and generate first shift information SH1, which is provided to the align shifter 23, based on the maximum value. The first shift information SH1 may include information about a shift direction and a shift amount, which correspond to each of the first through fourth fraction multiplication results F_mul1, F_mul2, F_mul3, and F_mul4 from the multiplier 21 and the fraction ACC1_F of the first cumulative data ACC1. In detail, the sign and exponent calculator 22 may generate the first shift information SH1 to perform an align shift of each of the first through fourth fraction multiplication results F_mul1, F_mul2, F_mul3, and F_mul4 and the fraction ACC1_F of the first cumulative data ACC1 in a direction, which corresponds to a difference between each of the exponent addition results and the exponent ACC1_E of the first cumulative data ACC1 and the maximum value, by the number of bits, which corresponds to the difference between each of the exponent addition results and the exponent ACC1_E of the first cumulative data ACC1 and the maximum value.

In an example embodiment, the align shifter 23 may perform an align shift of the first through fourth fraction multiplication results F_mul1, F_mul2, F_mul3, and F_mul4 and the fraction ACC1_F of the first cumulative data ACC1 based on the first shift information SH1 and provide first through fourth aligned fraction multiplication results F_align1, F_align2, F_align3, and F_align4 and an aligned fraction ACC1_F_align to the adder 24.

In an example embodiment, the adder 24 may simultaneously receive the first through fourth aligned fraction multiplication results F_align1, F_align2, F_align3, and F_align4 and the aligned fraction ACC1_F_align so as to simultaneously perform a dot product operation and an accumulation operation. The adder 24 may include a first adder circuit 24_1 and a second adder circuit 24_2. The first adder circuit 24_1 may generate first addition result data F_add1 by adding up upper bits of the first through fourth aligned fraction multiplication results F_align1, F_align2, F_align3, and F_align4 and the aligned fraction ACC1_F_align, wherein the upper bits include respective MSBs of the first through fourth aligned fraction multiplication results F_align1, F_align2, F_align3, and F_align4 and the aligned fraction ACC1_F_align. The second adder circuit 24_2 may generate second addition result data F_add2 by adding up lower bits of the first through fourth aligned fraction multiplication results F_align1, F_align2, F_align3, and F_align4 and the aligned fraction ACC1_F_align, wherein the lower bits include respective least significant bits (LSBs) of the first through fourth aligned fraction multiplication results F_align1, F_align2, F_align3, and F_align4 and the aligned fraction ACC1_F_align.

According to an example embodiment, one of the first and second adder circuits 24_1 and 24_2 of the adder 24 may be shared with an integer multiplier, which performs an integer multiplication operation, and thus be used for a floating-point calculation, an integer calculation, and the like. Therefore, the size of a neural network device including the floating-point arithmetic circuit 20 may be effectively reduced.

In an example embodiment, the post-adder 25 may receive the first and second addition result data F_add1 and F_add2 and generate second cumulative data ACC2.

The leading one detection circuit 25_1 may perform in parallel a first leading one detection on a first number of upper bits of third addition result data, which results from summation of the first and second addition result data F_add1 and F_add2, and a second leading one detection on a second number of lower bits of the third addition result data, wherein the upper bits include the MSB of the third addition result data, and the lower bits include the LSB of the third addition result data. In other words, the leading one detection circuit 25_1 may detect "1" while shifting the upper bits of the third addition result data in a direction from the MSB toward lower bits during the first leading one detection. At this time, a maximum number of shiftable bits may be the same as the first number. The leading one detection circuit 25_1 may detect "1" while shifting the lower bits of the third addition result data in a direction from the LSB toward upper bits during the second leading one detection. At this time, a maximum number of shiftable bits may be the same as the second number. In an example embodiment, the first number may be different from the second number. For example, the first number may be less than the second number. The leading one detection circuit 25_1 may perform a shift of the third addition result data based on the results of the first and second leading one detections. In detail, the leading one detection circuit 25_1 may perform a shift of the third addition result data in a shift direction, which corresponds to the result of the first or second leading one detection having detected "1", by the number of bits, which corresponds to the result of the first or second leading one detection.

The normalization and rounding circuit 25_2 may perform normalization of shifted third addition result data according to the position of "1" and perform rounding on the shifted third addition result data according to the number of bits in the format of data output from the floating-point arithmetic circuit 20.

The cumulative data generation circuit 25_3 may generate the second cumulative data ACC2 by reflecting an exponent value and a sign in normalized and rounded third addition result data based on the exponent information EI and the sign information SI and store the second cumulative data ACC2 in the buffer 26.

Referring to FIG. 7B, in a first case 'Case1', the floating-point arithmetic circuit 20 may receive first and second floating-point data IN_A and IN_B, which have the same type format for a dot product operation. Respective sign bit fields Sa and Sb of the first and second floating-point data IN_A and IN_B may have the same width, respective exponent bit fields Ea and Eb of the first and second floating-point data IN_A and IN_B may have the same width, and respective fraction bit fields Fa and Fb of the first and second floating-point data IN_A and IN_B may have the same width. For example, the first and second floating-point data IN_A and IN_B may have the FP16-type format.

In a second case 'Case2', the floating-point arithmetic circuit 20 may receive the first and second floating-point data IN_A and IN_B, which have different type formats for a dot product operation. The respective sign bit fields Sa and Sb of the first and second floating-point data IN_A and IN_B may have the same width as each other, the respective exponent bit fields Ea and Eb of the first and second floating-point data IN_A and IN_B may have different widths from each other, and the respective fraction bit fields Fa and Fb of the first and second floating-point data IN_A and IN_B may have different widths from each other. For example, the first and second floating-point data IN_A and IN_B may respectively have the FP16-type format and the BF16-type format.

In a third case 'Case3', the floating-point arithmetic circuit 20 may receive the first and second floating-point data IN_A and IN_B, which have the same type format for a dot product operation. The respective sign bit fields Sa and Sb of the first and second floating-point data IN_A and IN_B may have the same width, the respective exponent bit fields Ea and Eb of the first and second floating-point data IN_A and IN_B may have the same width, and the respective fraction bit fields Fa and Fb of the first and second floating-point data IN_A and IN_B may have the same width. For example, the first and second floating-point data IN_A and IN_B may have the BF16-type format.

The description given about the floating-point arithmetic circuit 20 with reference to FIGS. 7A and 7B is merely an example, and embodiments are not limited thereto. The floating-point arithmetic circuit 20 may be embodied in various ways. The floating-point arithmetic circuit 20 may receive and perform a dot product operation on various numbers of floating-point data pieces having various type formats.

Figure 8A:
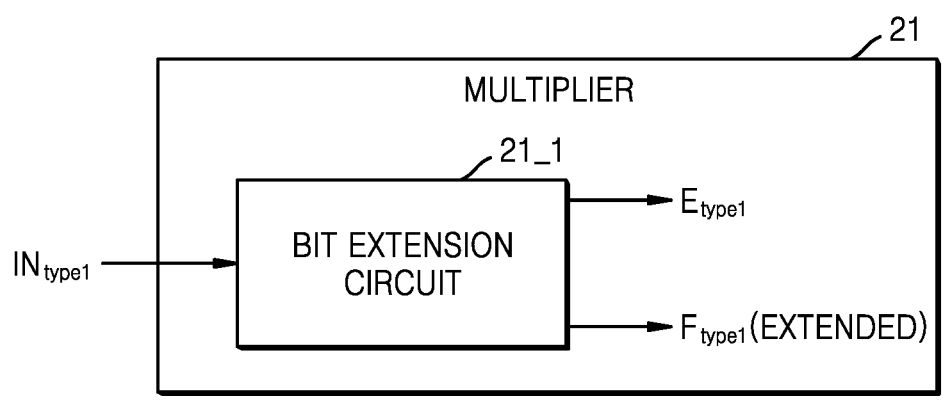
FIGS. 8A and 8B are diagrams of a multiplier that performs bit extension according to a type of a format of floating-point data.
Figure 8B:
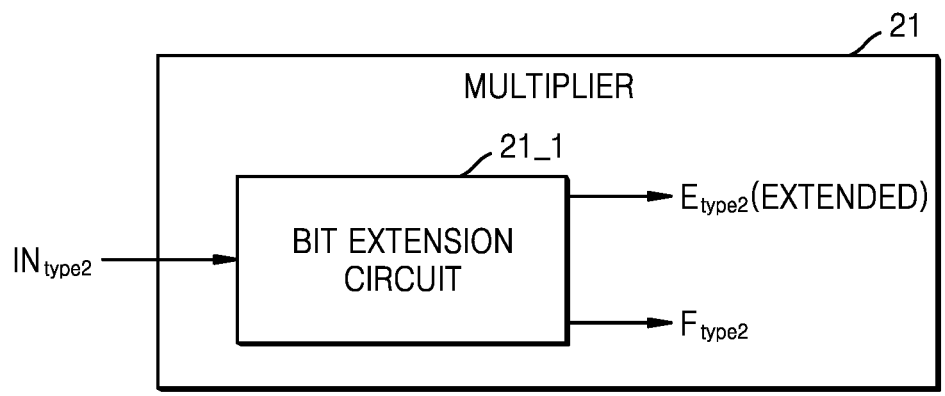

FIGS. 8A and 8B are diagrams of the multiplier 21 that performs bit extension according to the type of the format of floating-point data.

Referring to FIG. 8A, the multiplier 21 may include a bit extension circuit 21_1. In an example embodiment, the bit extension circuit 21_1 may extend at least one of an exponent bit field and a fraction bit field, which are included in floating-point data, according to the type of the format of the floating-point data. For example, the bit extension circuit 21_1 may receive floating-point data $IN_{type1}$ of a first type, output an exponent $E_{type1}$ of the floating-point data $IN_{type1}$ as it is, and extend the bit field of a fraction $F_{type1}$ of the floating-point data $IN_{type1}$ to an agreed first bit width. The agreed first bit width may be related to at least one of a bit width of a fraction $F_{type2}$ of floating-point data $IN_{type2}$ of a second type, a bit width of the multiplier 21 of FIG. 7A, the number of bits in output data of a floating-point arithmetic circuit, and a type of the format of output data.

Referring to FIG. 8B, the bit extension circuit 21_1 may receive the floating-point data $IN_{type2}$ of the second type, extend the bit field of an exponent $E_{type2}$ of the floating-point data $IN_{type2}$ to an agreed second bit width, and output the fraction $F_{type2}$ of the floating-point data $IN_{type2}$ as it is. The agreed second bit width may be related to a bit width of the exponent $E_{type1}$ of the floating-point data $IN_{type1}$ of the first type.

For example, when the first type is BF16 and the second type is FP16, the first bit width may have been agreed to be 11 bits (the sum of one bit and 10 bits corresponding to the bit width of the fraction $F_{type2}$ of the FP16) according to the bit width of the fraction $F_{type2}$ of the FP16. In other words, the fraction $F_{type1}$ of the floating-point data $IN_{type1}$ having the BF16 format may be extended to correspond to the bit width of the fraction $F_{type2}$ of the floating-point data $IN_{type2}$ having the FP16 format and then undergo a multiplication operation.

For example, the second bit width may have been agreed to be 8 bits according to the bit width of the exponent $E_{type1}$ of the BF16. In other words, the exponent $E_{type2}$ of the floating-point data $IN_{type2}$ having the FP16 format may be extended to correspond to the bit width of the exponent $E_{type1}$ of the floating-point data $IN_{type1}$ having the BF16 format and then undergo an addition operation.

FIGS. 9 through 12 are diagrams for describing the operations of floating-point arithmetic circuits 20a, 20b, 20c, and 20d, according to an example embodiment.

Figure 9:
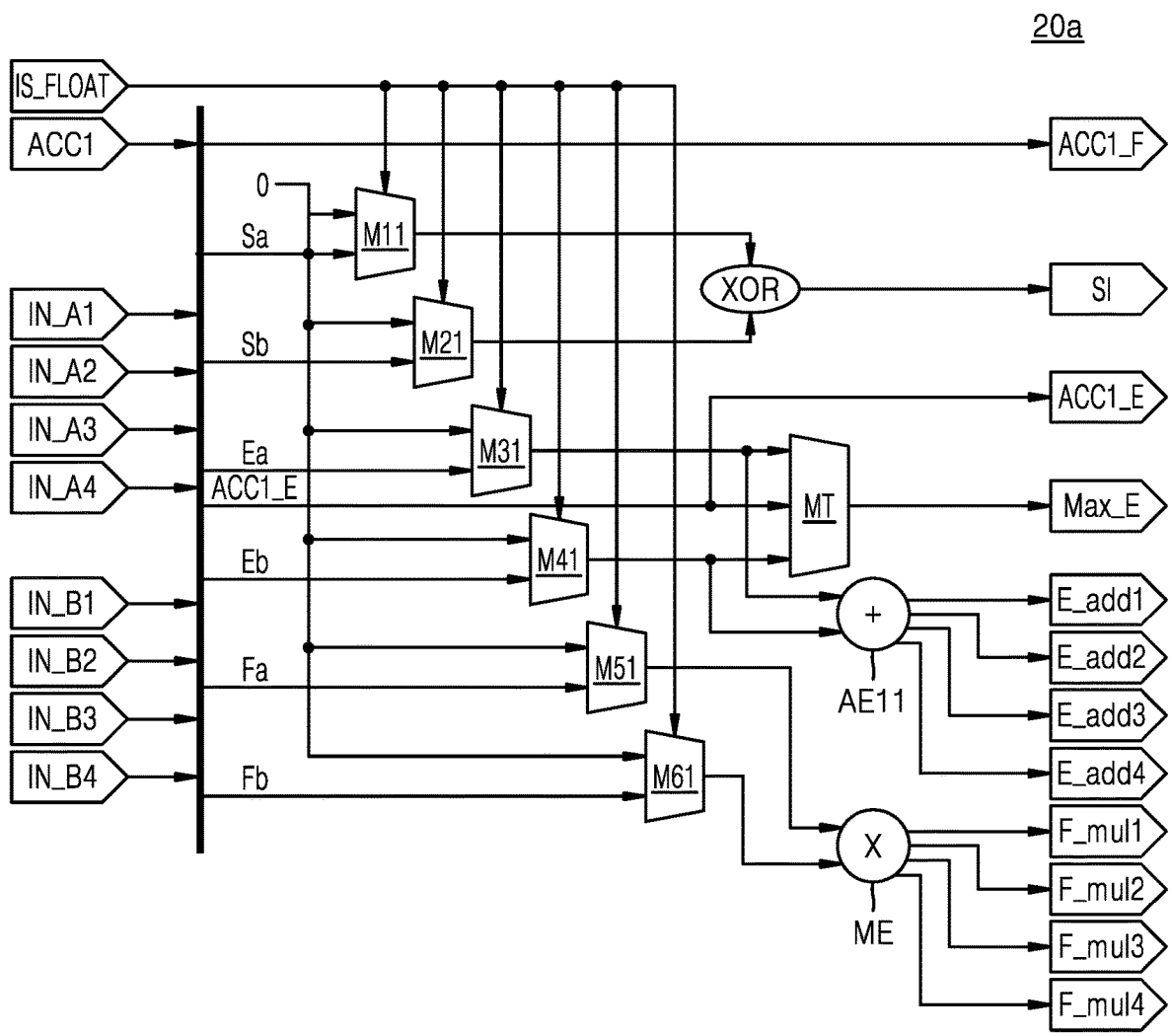
FIGS. 9 through 12 are diagrams for describing operations of floating-point arithmetic circuits, according to an example embodiment.

Referring to FIG. 9, the floating-point arithmetic circuit 20a may include first through sixth multiplexers M11, M21, M31, M41, M51, and M61, an XOR circuit XOR, a max tree circuit MT, a first adder element AE11, and a multiplier element ME.

The first through sixth multiplexers M11 through M61 may output "0" in response to a signal IS_FLOAT when the floating-point arithmetic circuit 20a operates in an integer calculation mode. Because of "0" output from the first through sixth multiplexers M11 through M61, elements for a floating-point calculation in the floating-point arithmetic circuit 20a may be deactivated. Hereinafter, descriptions will be made based on the fact that the floating-point arithmetic circuit 20a operates in a floating-point calculation mode.

The floating-point arithmetic circuit 20a may receive the first through eighth floating-point data IN_A1, IN_B1, IN_A2, IN_B2, IN_A3, IN_B3, IN_A4, and IN_B4 and the first cumulative data ACC1. The first multiplexer M11 may sequentially output respective signs Sa of the first, third, fifth, and seventh floating-point data IN_A1, IN_A2, IN_A3, and IN_A4 to the XOR circuit XOR. The second multiplexer M21 may sequentially output respective signs Sb of the second, fourth, sixth, and eighth floating-point data IN_B1, IN_B2, IN_B3, and IN_B4 to the XOR circuit XOR. The XOR circuit XOR may perform an XOR operation on the signs Sa and Sb and generate the sign information SI.

The third multiplexer M31 may sequentially output respective first exponents Ea of the first, third, fifth, and seventh floating-point data IN_A1, IN_A2, IN_A3, and IN_A4 to each of the max tree circuit MT and the first adder element AE11 The fourth multiplexer M41 may sequentially output respective second exponents Eb of the second, fourth, sixth, and eighth floating-point data IN_B1, IN_B2, IN_B3, and IN_B4 to each of the max tree circuit MT and the first adder element AE11.

The max tree circuit MT may receive a third exponent ACC1_E of the first cumulative data ACC1 and the first and second exponents Ea and Eb and identify and output a maximum value Max E for an align shift. In an example embodiment, the max tree circuit MT may perform an addition operation on each pair of corresponding first and second exponents Ea and Eb, compare a plurality of exponent addition results and the third exponent ACC1_E with one another, and output the largest exponent value as the maximum value Max_E.

The first adder element AE11 may output first through fourth exponent addition results E_add1, E_add2, E_add3, and E_add4 by performing an addition operation on each pair of corresponding first and second exponents Ea and Eb (e.g., first and second exponents Ea and Eb of a pair of floating-point data IN_A1 and IN_B1, first and second exponents Ea and Eb of a pair of floating-point data IN_A2 and IN_B2, first and second exponents Ea and Eb of a pair of floating-point data IN_A3 and IN_B3, and first and second exponents Ea and Eb of a pair of floating-point data IN_A4 and IN_B4).

The fifth multiplexer M51 may sequentially output respective first fractions Fa of the first, third, fifth, and seventh floating-point data IN_A1, IN_A2, IN_A3, and IN_A4 to the multiplier element ME. The sixth multiplexer M61 may sequentially output respective second fractions Fb of the second, fourth, sixth, and eighth floating-point data IN_B1, IN_B2, IN_B3, and IN_B4 to the multiplier element ME.

The multiplier element ME may output the first through fourth fraction multiplication results F_mul1, F_mul2, F_mul3, and F_mul4 by performing a multiplication operation on each pair of corresponding first and second fractions Fa and Fb (e.g., first and second fractions Fa and Fb of the pair of floating-point data IN_A1 and IN_B1, first and second fractions Fa and Fb of the pair of floating-point data IN_A2 and IN_B2, first and second fractions Fa and Fb of the pair of floating-point data IN_A3 and IN_B3, and first and second fractions Fa and Fb of the pair of floating-point data IN_A4 and IN_B4.

Figure 10:
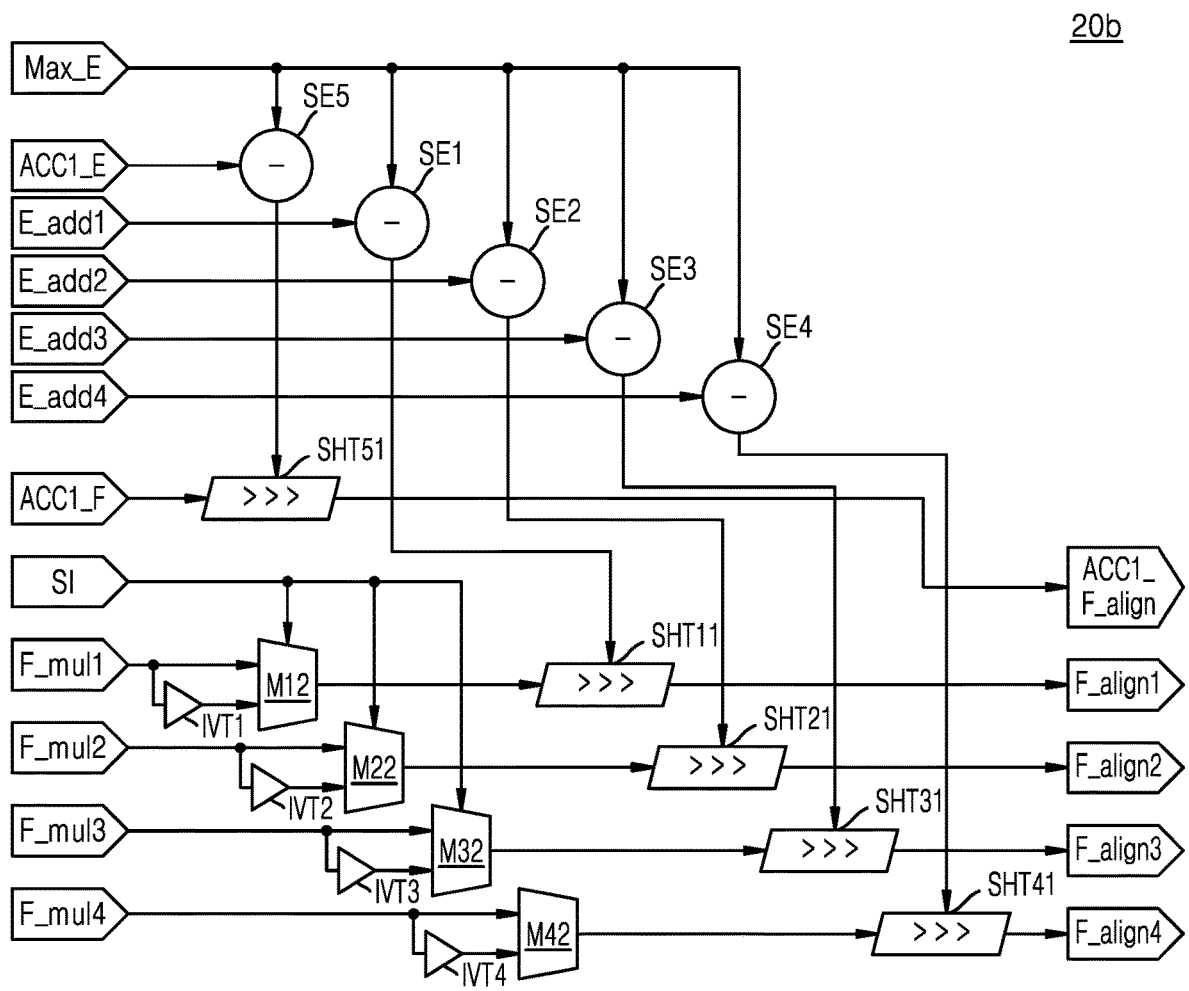

Referring further to FIG. 10, the floating-point arithmetic circuit 20b may include first through fourth inverters IVT1, IVT2, IVT3, and IVT4, seventh through tenth multiplexers M12, M22, M32, and M42, first through fifth shift circuits SHT11, SHT21, SHT31, SHT41, and SHT51, and first through fifth subtractor elements SE1, SE2, SE3, SE4, and SE5.

The seventh multiplexer M12 may receive the first fraction multiplication result F_mul1 and a first inverted fraction multiplication result, which is output from the first inverter IVT1. The eighth multiplexer M22 may receive the second fraction multiplication result F_mul2 and a second inverted fraction multiplication result, which is output from the second inverter IVT2. The ninth multiplexer M32 may receive the third fraction multiplication result F_mul3 and a third inverted fraction multiplication result, which is output from the third inverter IVT3. The tenth multiplexer M42 may receive the fourth fraction multiplication result F_mul4 and a fourth inverted fraction multiplication result, which is output from the fourth inverter IVT4.

Each of the seventh through tenth multiplexers M12 through M42 may output a non-inverted fraction multiplication result or an inverted fraction multiplication result in response to a corresponding sign in the sign information SI. For example, the seventh multiplexer M12 may output the first fraction multiplication result F_mul1 when the first fraction multiplication result F_mul1 is a positive number and output the first inverted fraction multiplication result when the first fraction multiplication result F_mul1 is a negative number.

The first subtractor element SE1 may perform a subtraction operation on the maximum value Max_E and the first exponent addition result E_add1 and provide a subtraction result to the first shift circuit SHT11. The first shift circuit SHT11 may output the first aligned fraction multiplication result F_align1 by shifting the output of the seventh multiplexer M12 in a direction, which corresponds to a difference between the maximum value Max_E and the first exponent addition result E_add1, by the number of bits, which corresponds to the difference between the maximum value Max_E and the first exponent addition result E_add1.

The second subtractor element SE2 may perform a subtraction operation on the maximum value Max_E and the second exponent addition result E_add2 and provide a subtraction result to the second shift circuit SHT21. The second shift circuit SHT21 may output the second aligned fraction multiplication result F_align2 by shifting the output of the eighth multiplexer M22 in a direction, which corresponds to a difference between the maximum value Max_E and the second exponent addition result E_add2, by the number of bits, which corresponds to the difference between the maximum value Max_E and the second exponent addition result E_add2.

The third subtractor element SE3 may perform a subtraction operation on the maximum value Max_E and the third exponent addition result E_add3 and provide a subtraction result to the third shift circuit SHT31. The third shift circuit SHT31 may output the third aligned fraction multiplication result F_align3 by shifting the output of the ninth multiplexer M32 in a direction, which corresponds to a difference between the maximum value Max_E and the third exponent addition result E_add3, by the number of bits, which corresponds to the difference between the maximum value Max_E and the third exponent addition result E_add3.

The fourth subtractor element SE4 may perform a subtraction operation on the maximum value Max_E and the fourth exponent addition result E_add4 and provide a subtraction result to the fourth shift circuit SHT41. The fourth shift circuit SHT41 may output the fourth aligned fraction multiplication result F_align4 by shifting the output of the tenth multiplexer M42 in a direction, which corresponds to a difference between the maximum value Max_E and the fourth exponent addition result E_add4, by the number of bits, which corresponds to the difference between the maximum value Max_E and the fourth exponent addition result E_add4.

The fifth subtractor element SE5 may perform a subtraction operation on the maximum value Max_E and the third exponent ACC1_E of the first cumulative data ACC1 and provide a subtraction result to the fifth shift circuit SHT51. The fifth shift circuit SHT51 may output the aligned fraction ACC1_F_align by shifting the fraction ACC1_F of the first cumulative data ACC1 in a direction, which corresponds to a difference between the maximum value Max_E and the third exponent ACC1_E, by the number of bits, which corresponds to the difference between the maximum value Max_E and the third exponent ACC1_E.

In an example embodiment, a maximum shift mount of the first through fifth shift circuits SHT11 through SHT51 may be limited so as not to influence an operation accuracy required by a neural network device while reducing the size and power consumption of a shift circuit.

Figure 11:
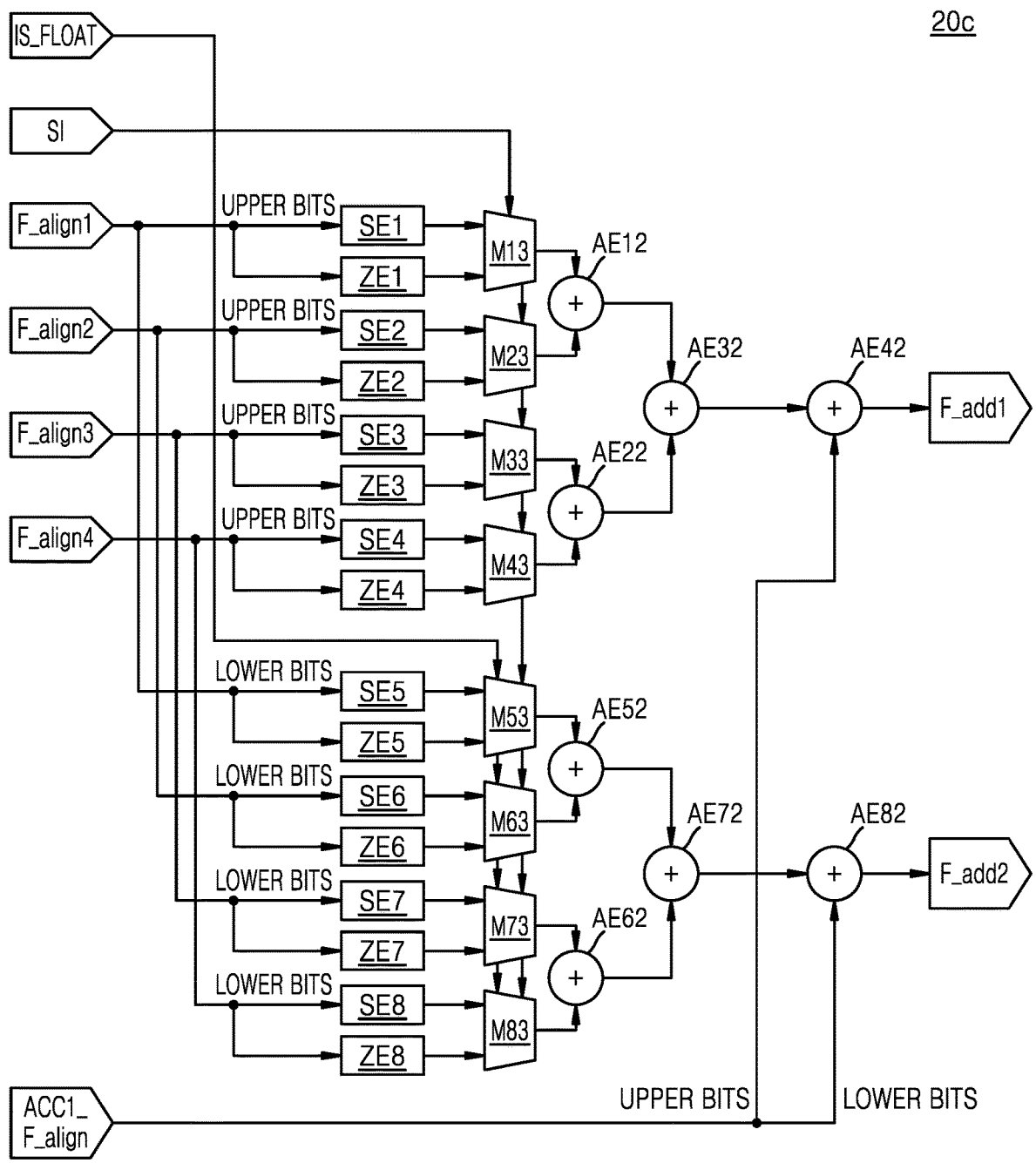

Referring further to FIG. 11, the floating-point arithmetic circuit 20c may include first through eighth sign extension circuits SE1, SE2, SE3, SE4, SE5, SE6, SE7, and SE8, first through eighth zero extension circuit ZE1, ZE2, ZE3, ZE4, ZE5, ZE6, ZE7, and ZE8, eleventh through eighteenth multiplexers M13, M23, M33, M43, M53, M63, M73, and M83, and second through ninth adder elements AE12, AE22, AE32, AE42, AE52, AE62, AE72, and AE82. Hereinafter, convenience of description, the first through fourth aligned fraction multiplication results F_align1 through F_align4 are referred to as first through fourth fraction multiplication results F_align1 through F_align4.

The eleventh multiplexer M13 may receive first extended upper bits of the first fraction multiplication result F_align1 from a first sign extension circuit SE1 and second extended upper bits of the first fraction multiplication result F_align1 from a first zero extension circuit ZE1. The first sign extension circuit SE1 may generate the first extended upper bits of the first fraction multiplication result F_align1 by copying a sign to extension bits appended to the upper bits of the first fraction multiplication result F_align1 such that the extension bits are filled with 1s. The first zero extension circuit ZE1 may generate the second extended upper bits of the first fraction multiplication result F_align1 by filling extension bits appended to the upper bits of the first fraction multiplication result F_align1 with 0s.

In this manner, each of the twelfth through fourteenth multiplexers M23 through M43 may receive first extended upper bits and second extended upper bits of a corresponding one of the second through fourth fraction multiplication results F_align2 through F_align4, wherein the first extended upper bits include extension bits filled with 1s by copying a sign to the extension bits using a corresponding one of second through fourth sign extension circuits SE2 through SE4, and the second extended upper bits include extension bits filled with 0s by a corresponding one of second through fourth zero extension circuits ZE2 through ZE4.

The fifteenth multiplexer M53 may receive first extended lower bits of the first fraction multiplication result F_align1 from a fifth sign extension circuit SE5 and second extended lower bits of the first fraction multiplication result F_align1 from a fifth zero extension circuit ZE5. The fifth sign extension circuit SE5 may generate the first extended lower bits of the first fraction multiplication result F_align1 by copying a sign to extension bits appended to the lower bits of the first fraction multiplication result F_align1 such that the extension bits are filled with 1s. The fifth zero extension circuit ZE5 may generate the second extended lower bits of the first fraction multiplication result F_align1 by filling extension bits appended to the lower bits of the first fraction multiplication result F_align1 with 0s.

In this manner, each of the sixteenth through eighteenth multiplexers M63 through M83 may receive first extended lower bits and second extended lower bits of a corresponding one of the second through fourth fraction multiplication results F_align2 through F_align4, wherein the first extended lower bits include extension bits filled with 1s by copying a sign to the extension bits using a corresponding one of sixth through eighth sign extension circuits SE6 through SE8, and the second extended lower bits include extension bits filled with 0s by a corresponding one of sixth through eighth zero extension circuits ZE6 through ZE8.

In an example embodiment, in a floating-point calculation mode (e.g., IS_FLOAT=1), each of the eleventh through fourteenth multiplexers M13 through M43 may output the first extended upper bits, which are received from a corresponding one of the first through fourth sign extension circuits SE1 through SE4, in response to a corresponding sign in the sign information SI. In the floating-point calculation mode (e.g., IS_FLOAT=1), each of the fifteenth through eighteenth multiplexers M53 through M83 may output the second extended lower bits, which are received from a corresponding one of the fifth through eighth zero extension circuits ZE5 through ZE8.

In some embodiments, in an integer calculation mode (e.g., IS_FLOAT=0), each of the eleventh through fourteenth multiplexers M13 through M43 may output the first extended upper bits, which are received from a corresponding one of the first through fourth sign extension circuits SE1 through SE4, or the second extended upper bits, which are received from a corresponding one of the first through fourth zero extension circuits ZE1 through ZE4, in response to a corresponding sign in the sign information SI. In the integer calculation mode (e.g., IS_FLOAT=0), each of the fifteenth through eighteenth multiplexers M53 through M83 may output the first extended lower bits, which are received from a corresponding one of the fifth through eighth sign extension circuits SE5 through SE8, or the second extended lower bits, which are received from a corresponding one of the fifth through eighth zero extension circuits ZE5 through ZE8, in response to a corresponding sign in the sign information SI. In the integer calculation mode, the first through fourth aligned fraction multiplication results F_align1 through F_align4 may be replaced with integer multiplication results.

The second adder element AE12 may add an output of the eleventh multiplexer M13 to an output of the twelfth multiplexer M23. The third adder element AE22 may add an output of the thirteenth multiplexer M33 to an output of the fourteenth multiplexer M43. The fourth adder element AE32 may add an output of the second adder element AE12 to an output of the third adder element AE22. The fifth adder element AE42 may generate the first addition result data F_add1 by adding an output of the fourth adder element AE32 to the upper bits of the aligned fraction ACC1_F_align. Although not shown, the upper bits of the aligned fraction ACC1_F_align, which are input to the fifth adder element AE42, may correspond to sign extended data.

The sixth adder element AE52 may add an output of the fifteenth multiplexer M53 to an output of the sixteenth multiplexer M63. The seventh adder element AE62 may add an output of the seventeenth multiplexer M73 to an output of the eighteenth multiplexer M83. The eighth adder element AE72 may add an output of the sixth adder element AE52 to an output of the seventh adder element AE62. The ninth adder element AE82 may generate the second addition result data F_add2 by adding an output of the eighth adder element AE72 to the lower bits of the aligned fraction ACC1_F_align. Although not shown, the lower bits of the aligned fraction ACC1_F_align, which are input to the ninth adder element AE82, may correspond to zero extended data.

Figure 12:
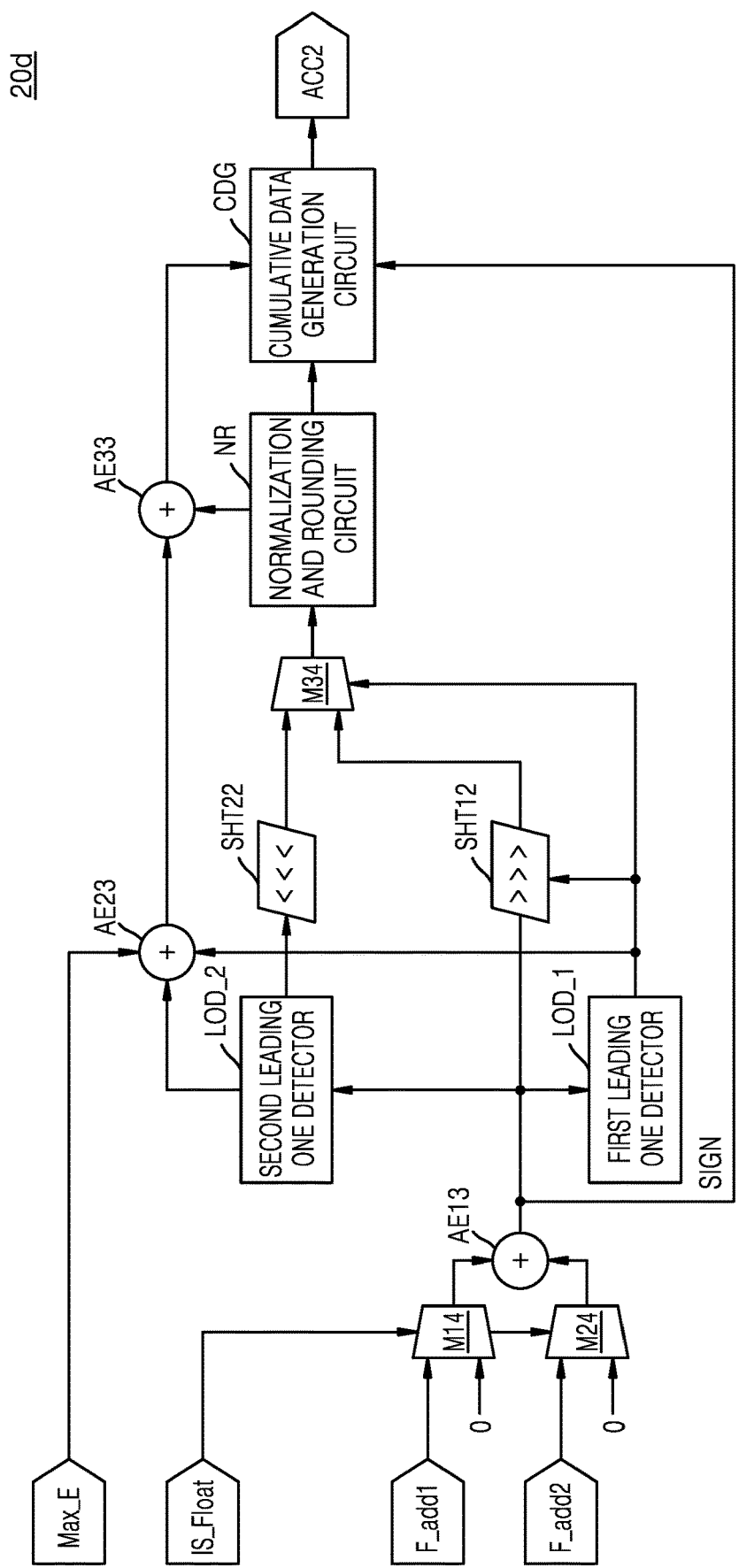

Referring to FIG. 12, the floating-point arithmetic circuit 20d may include nineteenth through twenty-first multiplexers M14, M24, and M34, tenth through twelfth adder elements AE13, AE23, and AE33, first and second leading one detectors LOD_1 and LOD_2, sixth and seventh shift circuits SHT12 and SHT22, a normalization and rounding circuit NR, and a cumulative data generation circuit CDG.

The nineteenth and twentieth multiplexers M14 and M24 may output "0" in response to the signal IS_FLOAT when the floating-point arithmetic circuit 20d operates in the integer calculation mode. Because of "0" output from the nineteenth and twentieth multiplexers M14 and M24, elements for a floating-point calculation in the floating-point arithmetic circuit 20d may be deactivated. Hereinafter, descriptions will be made based on the assumption that the floating-point arithmetic circuit 20d operates in the floating-point calculation mode.

The nineteenth multiplexer M14 may output the first addition result data F_add1 to the tenth adder element AE13. The twentieth multiplexer M24 may output the second addition result data F_add2 to the tenth adder element AE13.

The tenth adder element AE13 may generate third addition result data by adding the first addition result data F_add1 to the second addition result data F_add2. The first leading one detector LOD_1 may perform first leading one detection on "k" upper bits including the MSB of the third addition result data, from which at least one bit representing a sign is removed, where "k" is an integer of at least 1. The second leading one detector LOD_2 may perform second leading one detection on "n" lower bits including the LSB of the third addition result data, from which the at least one bit representing the sign is removed, where "n" is an integer of at least 1. The first and second leading one detectors LOD_1 and LOD_2 may perform in parallel. For example, "k" may be less than "n". The at least one bit representing the sign of the third addition result data may be provided to the cumulative data generation circuit CDG.

The sixth shift circuit SHT12 may shift the third addition result data, which is output from the first leading one detector LOD_1, in a first direction. The seventh shift circuit SHT22 may shift the third addition result data, which is output from the second leading one detector LOD_2, in a second direction. For example, the first direction may be opposite to the second direction. The first direction may be from an upper bit toward a lower bit, and the second direction may be from a lower bit toward an upper bit.

The eleventh adder element AE23 may receive the maximum value Max_E and shift information, which results from the detection of the first and second leading one detectors LOD_1 and LOD_2, and add the maximum value Max_E to the shift information. The shift information may indicate the position of "1" detected in the third addition result data and may be generated by one of the first and second leading one detectors LOD_1 and LOD_2

The twenty-first multiplexer M34 may provide an output, which corresponds to a leading one detector that has detected "1" among respective outputs of the sixth and seventh shift circuits SHT12 and SHT22, to the normalization and rounding circuit NR.

The normalization and rounding circuit NR may perform normalization and rounding on the third addition result data, which has undergone shifting by the sixth of seventh shift circuit SHT12 or SHT22, and provide exponent update information to the twelfth adder element AE33.

The twelfth adder element AE33 may add the exponent update information to an output of the eleventh adder element AE23 and provide an addition result to the cumulative data generation circuit CDG.

The cumulative data generation circuit CDG may generate the second cumulative data ACC2 using the sign of the third addition result data, an output of the normalization and rounding circuit NR, and an output of the twelfth adder element AE33.

Figure 13:
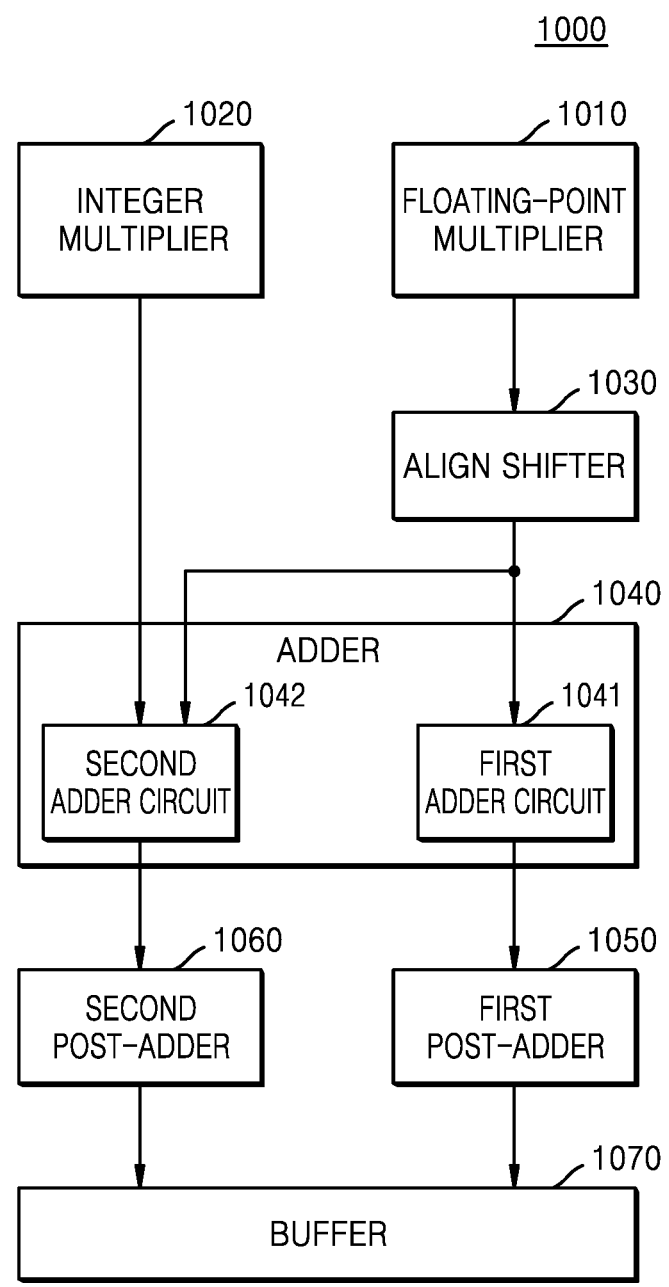
FIG. 13 is a block diagram of an arithmetic circuit included in a neural network device, according to an example embodiment.

FIG. 13 is a block diagram of an arithmetic circuit 1000 included in a neural network device, according to an example embodiment.

Referring to FIG. 13, the arithmetic circuit 1000 may include a floating-point multiplier 1010, an integer multiplier 1020, an align shifter 1030, an adder 1040, a first post-adder 1050, a second post-adder 1060, and a buffer 1070. Besides the elements shown in FIG. 13, the arithmetic circuit 1000 may further include a plurality of elements to perform various neural network operations. The adder 1040 may include a first adder circuit 1041 and a second adder circuit 1042, which are logically or physically separate from each other. In an example embodiment, the arithmetic circuit 1000 may perform a dot product operation and an accumulation operation on floating-point data pieces and perform a dot product operation on integer data pieces.

In an example embodiment, the second adder circuit 1042 of the adder 1040 may be shared by the floating-point multiplier 1010 and the integer multiplier 1020. The floating-point multiplier 1010 may support an integer multiplication operation when the arithmetic circuit 1000 is in an integer calculation mode.

In an example embodiment, when the arithmetic circuit 1000 is in a floating-point calculation mode, the floating-point multiplier 1010 may perform a floating-point calculation and provide fraction multiplication results to the first and second adder circuits 1041 and 1042 through the align shifter 1030. When the calculation circuit 1000 is in the integer calculation mode, the integer multiplier 1020 may perform an integer calculation and provide first integer multiplication results to the second adder circuit 1042, and the floating-point multiplier 1010 may perform an integer calculation and directly provide second integer multiplication results to the first adder circuit 1041 without passing the align shifter 1030

In an example embodiment, when the calculation circuit 1000 is in the floating-point calculation mode, the adder 1040 may add the aligned fraction multiplication results of the floating-point data pieces to the fraction of cumulative data and provide addition result data to the first post-adder 1050. The first post-adder 1050 may generate second cumulative data by performing leading one detection, normalization, and rounding on the addition result data and reflect an updated exponent and store the second cumulative data in the buffer 1070.

In an example embodiment, when the arithmetic circuit 1000 is in the integer calculation mode, the adder 1040 may add up integer multiplication results of the integer data pieces all together and provide an addition result to the second post-adder 1060. The second post-adder 1060 may generate second output data based on the addition result and store the second output data in the buffer 1070.

In an example embodiment, the first post-adder 1050 and the second post-adder 1060 may be integrated with each other. In an example embodiment, the first post-adder 1050 and the second post-adder 1060 may be separate from each other.

Figure 14:
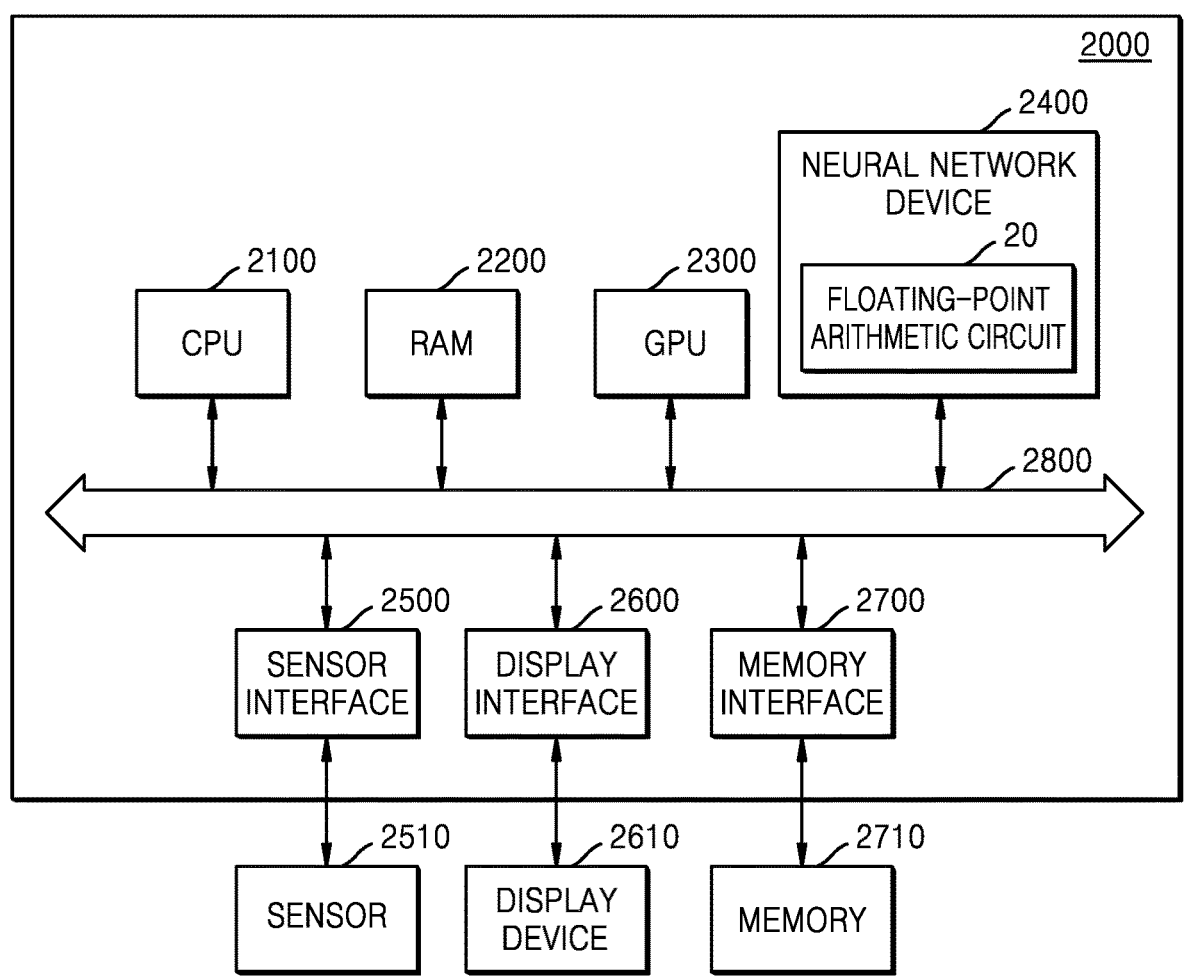
FIG. 14 is a block diagram of an application processor according to an example embodiment.

FIG. 14 is a block diagram of an application processor 2000 according to an example embodiment.

The application processor 2000 may include a CPU 2100, RAM 2200, a GPU 2300, a neural network device 2400, a sensor interface 2500, a display interface 2600, and a memory interface 2700. The application processor 2000 may further include a communication module. The elements, i.e., the CPU 2100, the RAM 2200, the GPU 2300, the neural network device 2400, the sensor interface 2500, the display interface 2600, and the memory interface 2700, of the application processor 2000 may exchange data with one another through a bus 2800.

The CPU 2100 may generally control operations of the application processor 2000. The CPU 2100 may include a single core or multiple cores. The CPU 2100 may process or execute programs and/or data, which are stored in a memory 2710. In an embodiment, the CPU 2100 may control the functions of the neural network device 2400 by executing the programs stored in the memory 2710.

The RAM 2200 may temporarily store programs, data, and/or instructions. In an embodiment, the RAM 2200 may include a DRAM or an SRAM. The RAM 2200 may temporarily store an image, which is input or output through interfaces, e.g., the sensor interface 2500 and the display interface 2600, or generated by the GPU 2300 or the CPU 2100.

The application processor 2000 may further include a ROM. The ROM may store programs and/or data, which are continuously used. The ROM may include an EPROM or an EEPROM.

The GPU 2300 may perform image processing on image data. For example, the GPU 2300 may perform image processing on image data that is received through the sensor interface 2500. In an embodiment, the GPU 2300 may perform a floating-point calculation.

The image data processed by the GPU 2300 may be stored in the memory 2710 or provided to a display device 2610 through the display interface 2600. The image data stored in the memory 2710 may be provided to the neural network device 2400.

The sensor interface 2500 may interface with data (e.g., image data, audio data, etc.) input from a sensor 2510 connected to the application processor 2000.

The display interface 2600 may interface with data (e.g., an image) output to the display device 2610. The display device 2610 may output an image or data about the image through a display such as, for example, a liquid crystal display (LCD) or an active matrix organic light-emitting diode (AMOLED) display.

The memory interface 2700 may interface with data input from the memory 2710 outside the application processor 2000 or data output to the memory 2710. In an embodiment, the memory 2710 may include volatile memory such as a DRAM or an SRAM or a non-volatile memory such as an RRAM, a PRAM, or a NAND flash memory. The memory 2710 may include a memory card such as a multimedia card (MMC), an embedded MMC (eMMC), an SD card, or a micro-SD card.

The neural network device 2400 may include the floating-point arithmetic circuit 20, which performs the floating-point calculation described above with reference to FIGS. 1 through 13. The floating-point arithmetic circuit 20 may perform a dot product operation and an accumulation operation on floating-point data pieces having various types of formats floating-point and reduce a shiftable bit width of an align shifter to an extent that an operation accuracy is not degraded. Accordingly, the size and power consumption of the floating-point arithmetic circuit 20 may be improved. The floating-point arithmetic circuit 20 may identify a maximum value from exponent addition results of floating-point data pieces and an exponent value of cumulative data in a dot product operation and perform an align shift and summation of fraction multiplication results of the floating-point data pieces and a fraction part of the cumulative data based on the maximum value. Example embodiments of the floating-point arithmetic circuit 20 have been described above and are thus omitted below.

While the disclosure has been particularly shown and described with reference to example embodiments thereof, it will be understood that various changes in form and details may be made therein without departing from the spirit and scope of the following claims.

What is claimed is:

1. A neural network device, comprising:
   a floating-point arithmetic circuit configured to perform a dot product operation and an accumulation operation; and
   a buffer configured to store first cumulative data generated by the floating-point arithmetic circuit,
   wherein the floating-point arithmetic circuit comprises:
      a sign and exponent calculator configured to identify a maximum value from a plurality of exponent addition results, obtained by respectively adding exponents of a plurality of floating-point data pairs, and an exponent value of the first cumulative data;
      a multiplier configured to generate a plurality of fraction multiplication results by respectively multiplying fractions of the plurality of floating-point data pairs;
      an align shifter configured to perform, based on the maximum value, an align shift of the plurality of fraction multiplication results and a fraction part of the first cumulative data;
      an adder configured to perform a summation of the plurality of aligned fraction multiplication results and the aligned fraction part of the first cumulative data; and
      a leading one detection circuit configured to perform a leading one detection on addition result data generated from the summation, to generate shift information,
   wherein the leading one detection circuit comprises:
      a first leading one detection circuit configured to perform a first leading one detection on a first number of upper bits of the addition result data generated from the summation; and
      a second leading one detection circuit configured to perform, in parallel with the first leading one detection, a second leading one detection on a second number of lower bits of the addition result data, the upper bits including a most significant bit (MSB) of the addition result data, and the lower bits including a least significant bit (LSB) of the addition result data,
   wherein the floating-point arithmetic circuit is configured to shift the addition result data based on results of the first leading one detection and the second leading one detection, and
   wherein the first number is less than the second number.

2. The neural network device of claim 1, wherein the floating-point arithmetic circuit is further configured to generate second cumulative data by performing normalization and rounding on a result of the shifting the addition result data, and store the second cumulative data in the buffer.

3. The neural network device of claim 1, wherein the floating-point arithmetic circuit is further configured to receive the plurality of floating-point data pairs and the first cumulative data to perform the dot product operation and the accumulation operation.

4. The neural network device of claim 1, wherein a plurality of data pieces included in the plurality of floating-point data pairs have a different type of a format than the first cumulative data.

5. The neural network device of claim 1, wherein a plurality of data pieces included in the plurality of floating-point data pairs have a floating-point 16 (FP16)-type format or a brain float 16 (BF16)-type format.

6. The neural network device of claim 5, wherein the first cumulative data has a floating-point 32 (FP32)-type format.

7. The neural network device of claim 5, wherein the floating-point arithmetic circuit is further configured to extend an exponent bit field of a first data piece among the plurality of data pieces and a fraction bit field of a second data piece among the plurality of data pieces, the first data piece having the FP16-type format, and the second data piece having the BF16-type format.

8. The neural network device of claim 1, wherein the adder includes:
   a first adder circuit configured to add upper bits of the plurality of aligned fraction multiplication results to upper bits of the aligned fraction part of the first cumulative data; and
   a second adder circuit configured to add lower bits of the plurality of aligned fraction multiplication results to lower bits of the aligned fraction part of the first cumulative data.

9. The neural network device of claim 8, wherein one of the first adder circuit and the second adder circuit is configured to be shared with an integer multiplier included in the neural network device, the integer multiplier being configured to perform an integer multiplication operation.

10. The neural network device of claim 8, wherein the floating-point arithmetic circuit is further configured to:
    generate second cumulative data by adding first addition result data, output from the first adder circuit, to second addition result data, output from the second adder circuit, and performing normalization and rounding on a result of adding the first addition result data and the second addition result data; and
    store the second cumulative data in the buffer.

11. The neural network device of claim 1, wherein the align shifter is further configured to:
    perform an align shift of each of the plurality of fraction multiplication results in a direction corresponding to a first difference between each of the plurality of exponent addition results and the maximum value by a number of bits corresponding to the first difference; and
    perform an align shift of the fraction part of the first cumulative data in a direction corresponding to a second difference between the fraction part of the first cumulative data and the maximum value by a number of bits corresponding to the second difference.

12. The neural network device of claim 11, wherein a shiftable bit width of the align shifter is determined based on an operation accuracy required by an application using data generated by the neural network device.

13. A method of operating a neural network device, the method comprising:

receiving a plurality of floating-point data pairs and first cumulative data;

identifying, by using a sign and exponent calculator, a maximum value from a plurality of exponent addition results, obtained by respectively adding exponents of the plurality of floating-point data pairs, and an exponent value of the first cumulative data;

obtaining, by using a multiplier, a plurality of fraction multiplication results by respectively multiplying fractions of the plurality of floating-point data pairs;

performing, by using an align shifter based on the maximum value, an align shift of the plurality of fraction multiplication results and a fraction part of the first cumulative data;

adding, by using an adder, the plurality of aligned fraction multiplication results to the aligned fraction part of the first cumulative data; and generating second cumulative data based on a result of the adding, wherein the generating the second cumulative data comprises:

performing, by using a leading one detection circuit, a leading one detection on addition result data generated from the adding, to generate shift information, wherein the leading one detection circuit comprises a first leading one detection circuit and a second leading one detection circuit, and the performing the leading one detection comprises:

performing, by using the first leading one detection circuit, a first leading one detection on a first number of upper bits of the addition result data generated from the adding; and performing, by using the second leading one detection circuit, in parallel with the first leading one detection, a second leading one detection on a second number of lower bits of the addition result data, the upper bits including a most significant bit (MSB) of the addition result data, and the lower bits including a least significant bit (LSB) of the addition result data; and shifting the addition result data based on results of the first leading one detection and the second leading one detection, wherein the first number is less than the second number.

14. The method of claim 13, wherein the performing the align shift includes:

performing an align shift of each of the plurality of fraction multiplication results in a direction corresponding to a first difference between each of the plurality of exponent addition results and the maximum value by a number of bits corresponding to the first difference; and performing an align shift of the fraction part of the first cumulative data in a direction corresponding to a second difference between the fraction part of the first cumulative data and the maximum value by a number of bits corresponding to the second difference.

15. The method of claim 13, wherein the generating the second cumulative data further comprises generating the second cumulative data by performing normalization and rounding on a result of the shifting the addition result data.

16. An application processor comprising a neural network device, wherein the neural network device is configured to perform a dot product operation and an accumulation operation by:

performing, by using an align shifter, an align shift of a plurality of fraction multiplication results, obtained by respectively multiplying fractions of a plurality of floating-point data pairs, and a fraction part of first cumulative data, based on a maximum value from a plurality of exponent addition results, obtained by respectively adding exponents of the plurality of floating-point data pairs, and an exponent value of the first cumulative data;

performing, by using an adder, a summation of the plurality of aligned fraction multiplication results and the aligned fraction part of the first cumulative data;

performing, by using a leading one detection circuit, a leading one detection on addition result data generated from the summation, to generate shift information, wherein the leading one detection circuit comprises a first leading one detection circuit and a second leading one detection circuit, and the performing the leading one detection comprises:

performing, by using the first leading one detection circuit, a first leading one detection on a first number of upper bits of the addition result data generated from the summation; and performing, by using the second leading one detection circuit, in parallel with the first leading one detection, a second leading one detection on a second number of lower bits of the addition result data, the upper bits including a most significant bit (MSB) of the addition result data, and the lower bits including a least significant bit (LSB) of the addition result data; and shifting the addition result data based on results of the first leading one detection and the second leading one detection, wherein the first number is less than the second number.

* * * * *